US012671902B2

(12) United States Patent (10) Patent No.: US 12,671,902 B2
Li et al. (45) Date of Patent: Jun. 30, 2026

(54) IMAGE ANTI-SHAKE METHOD AND ELECTRONIC DEVICE

(71) Applicant: HONOR DEVICE CO., LTD., Shenzhen (CN)

(72) Inventors: Zhiqi Li, Shenzhen (CN); Yu Wang, Shenzhen (CN); Congchao Zhu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 186 days.

(21) Appl. No.: 18/547,570

(22) PCT Filed: May 16, 2022

(86) PCT No.: PCT/CN2022/093035
§ 371 (c)(1),
(2) Date: Aug. 23, 2023

(87) PCT Pub. No.: WO2023/005355
PCT Pub. Date: Feb. 2, 2023

(65) Prior Publication Data
US 2024/0187736 A1 Jun. 6, 2024

(30) Foreign Application Priority Data

Jul. 30, 2021 (CN) .......................... 202110876036.6
Sep. 30, 2021 (CN) .......................... 202111163499.4

(51) Int. Cl.
*H04N 23/68* (2023.01)
(52) U.S. Cl.
CPC ....... *H04N 23/687* (2023.01); *H04N 23/6812* (2023.01); *H04N 23/683* (2023.01)

(58) Field of Classification Search
None
See application file for complete search history.

(56) References Cited

U.S. PATENT DOCUMENTS 9,232,138 B1 * 1/2016 Baldwin .............. H04N 23/682
10,148,880 B2 12/2018 Pettersson
(Continued)

FOREIGN PATENT DOCUMENTS

CN 107888821 A 4/2018
CN 108234873 A 6/2018
(Continued)

*Primary Examiner* — Rodney E Fuller
(74) *Attorney, Agent, or Firm* — Fish & Richardson P.C.

(57) ABSTRACT

The present application relates to an image anti-shake method and an electronic device. The method includes: enabling a camera application; receiving a first operation; acquiring a first image stream in response to the first operation, where the first image stream is an image stream collected by the camera in real time, the first image stream is an image stream that has been subjected to first anti-shake processing, and the first anti-shake processing includes anti-shake processing performed by the three-axis optical image stabilization controller; and processing the first image stream based on a first parameter and a second parameter to obtain a second image stream, where the first parameter is obtained based on the first anti-shake processing, the first parameter is used for restoring the first anti-shake processing, the second parameter is used for second anti-shake processing, and the first anti-shake processing is different from the second anti-shake processing.

20 Claims, 10 Drawing Sheets

(56)     References Cited

U.S. PATENT DOCUMENTS

| | | | |
|---|---|---|---|
| 10,348,969 B2 | 7/2019 | Murakami et al. | |
| 10,674,088 B2 | 6/2020 | Sun et al. | |
| 11,057,565 B2 | 7/2021 | Li et al. | |
| 2015/0326785 A1 | 11/2015 | Tsubaki | |
| 2016/0360111 A1 | 12/2016 | Thivent et al. | |
| 2017/0289454 A1* | 10/2017 | Pettersson | H04N 23/687 |
| 2017/0331998 A1 | 11/2017 | Yu | |
| 2018/0091739 A1* | 3/2018 | Murakami | H04N 23/683 |
| 2019/0260934 A1* | 8/2019 | Li | H04N 23/687 |
| 2020/0084358 A1 | 3/2020 | Nadamoto | |
| 2020/0404178 A1* | 12/2020 | Li | G06T 7/70 |
| 2020/0412954 A1 | 12/2020 | Gaizman et al. | |
| 2021/0136290 A1* | 5/2021 | Ikeda | H04N 23/687 |
| 2022/0286611 A1* | 9/2022 | Tsairi | H04N 23/6812 |
| 2022/0394180 A1* | 12/2022 | Wang | H04N 23/67 |

FOREIGN PATENT DOCUMENTS

| | | | |
|---|---|---|---|
| CN | 108702450 A | 10/2018 | |
| CN | 109660718 A | 4/2019 | |
| CN | 110233969 A | 9/2019 | |
| CN | 110620871 A | 12/2019 | |
| CN | 111711756 A | 9/2020 | |
| CN | 111722452 A | 9/2020 | |
| EP | 3417606 B1 | 8/2020 | |
| WO | 2017176514 A1 | 10/2017 | |
| WO | 2018072353 A1 | 4/2018 | |

* cited by examiner

Electronic device 100

(a) Disable optical image stabilization and electronic image stabilization (b) Enable optical image stabilization and disable electronic image stabilization (c) Enable optical image stabilization and electronic image stabilization

IMAGE ANTI-SHAKE METHOD AND ELECTRONIC DEVICE

CROSS-REFERENCE TO RELATED APPLICATIONS

This application is a national stage of International Application No. PCT/CN2022/093035, filed on May 16, 2022, which claims priority to Chinese Patent Application No. 202110876036.6, filed on Jul. 30, 2021, and Chinese Patent Application No. 202111163499.4, filed on Sep. 30, 2021. All of the aforementioned applications are hereby incorporated by reference in their entireties.

TECHNICAL FIELD

This application relates to the field of image processing, and specifically, to an image anti-shake method and an electronic device.

BACKGROUND

With the rapid development of image technologies, users' demands for the definition and the stability of video recording continue to increase. During photographing by a user, a shake inevitably exists. For example, the shake may refer to a hand-held shake of the user during photographing, or the shake may refer to a movement of the electronic device during photographing. Due to the shake during photographing, there is a motion blur in the acquired video or image.

At present, there is a three-axis optical image stabilization controller in the camera module. Compared with a conventional two-axis optical image stabilization device, a rotation axis is added to the three-axis optical image stabilization controller, which can improve the stabilization effect and the definition of images on the Z-axis. However, limited by the size of the device, the anti-shake angle of the three-axis optical image stabilization controller is still limited. For a scenario with a relatively large range of motion, for example, a scenario in which the user is running, the acquired image cannot obtain a relatively good anti-shake effect, resulting in poor stability of the image.

Therefore, for the three-axis optical image stabilization controller, how to perform image anti-shake processing to improve the image anti-shake effect has become a problem to be resolved urgently.

SUMMARY

This application provides an image anti-shake method and an electronic device, which can improve the definition of an image sequence and an anti-shake effect of an image stream.

According to a first aspect, an image anti-shake method is provided, applied to an electronic device, where the electronic device includes a camera and a three-axis optical image stabilization controller, and the method includes:

enabling a camera application;

receiving a first operation;

acquiring a first image stream in response to the first operation, where the first image stream is an image stream collected by the camera in real time, the first image stream is an image stream that has been subjected to first anti-shake processing, and the first anti-shake processing includes anti-shake processing performed by the three-axis optical image stabilization controller; and processing the first image stream based on a first parameter and a second parameter to obtain a second image stream, where the first parameter is obtained based on the first anti-shake processing, the first parameter is used for restoring the first anti-shake processing, the second parameter is used for second anti-shake processing, and the first anti-shake processing is different from the second anti-shake processing.

It should be understood that, the three-axis optical image stabilization controller may include a three-axis optical image stabilization module and a motor. The three-axis optical image stabilization module may be configured to perform first anti-shake processing, and the first anti-shake processing may include three-axis optical image stabilization processing. That is, the three-axis optical image stabilization controller may move an image sensor by controlling the motor, so that a shake generated by the electronic device during photographing is compensated. The motor included in the three-axis optical image stabilization controller may control the image sensor to move on the X-axis, the Y-axis, and the Z-axis. For example, the motor may control the image sensor to move on the X-axis and the Y-axis, and rotate on the Z-axis.

It should be further understood that, the second anti-shake processing may refer to electronic image stabilization processing. The electronic image stabilization processing is mainly to compensate a shake between a plurality of frames of images included in an image stream, a motion status between image frames in an image sequence can be acquired through a gyroscope sensor, and the motion between the image frames is compensated to generate a relatively stable image stream.

Optionally, the first operation may refer to an operation for instructing the camera to perform photographing, for example, instructing photographing by clicking a button on the camera application, or instructing photographing through voice information.

In an embodiment of this application, the first anti-shake processing and the second anti-shake processing may be restored on the first image stream. The first anti-shake processing includes anti-shake processing of the three-axis optical image stabilization controller, and the three-axis optical image stabilization controller can perform correction of the X-axis, the Y-axis, and the Z-axis. Therefore, compared with a two-axis optical image stabilization controller, Z-axis correction is introduced to the three-axis optical image stabilization controller, which can effectively improve the definition of the image sequence; and by performing the second anti-shake processing on the first image stream, a relatively good anti-shake effect can be obtained in a case that the electronic device moves by a relatively large magnitude. Therefore, processing the first image stream based on the first parameter and the second parameter can not only improve the definition of the image sequence, but also effectively reduce motion blur in the image, thereby improving the anti-shake effect of the image.

With reference to the first aspect, in some implementations of the first aspect, the processing the first image stream based on a first parameter and a second parameter to obtain a second image stream includes:

restoring the first anti-shake processing on the first image stream based on the first parameter, to obtain a third image stream; and performing the second anti-shake processing on the third image stream based on the second parameter, to obtain the second image stream.

3

It should be understood that, the three-axis optical image stabilization controller has a motion correction function, and the first image stream is an image stream obtained after the first anti-shake processing; and the second anti-shake processing cannot be directly superimposed on the first anti-shake processing. Therefore, when the second anti-shake processing is performed on the first image stream in a three-dimensional space, the first image stream needs to be restored to a third image stream on which no first anti-shake processing has been performed; and the second anti-shake processing is performed on the second image stream.

With reference to the first aspect, in some implementations of the first aspect, the electronic device includes a gyroscope sensor, the second parameter is obtained based on shake information collected by the gyroscope sensor, and the shake information is used for representing a pose change of the electronic device during photographing.

It should be understood that, "during photographing" means that the electronic device is in a photographing state. That is, the electronic device is in a process of starting photographing and not ending the photographing. For example, a photographing control is clicked, in response to the click operation, the electronic device starts photographing, the camera starts to collect an image that the user intends to capture, and until the sensor outputs the image, the photographing ends. The foregoing process from starting photographing to ending the photographing and not ending the photographing is "during photographing".

With reference to the first aspect, in some implementations of the first aspect, the second parameter is obtained based on the shake information and a constraint condition, and the constraint condition means that each image frame in the second image stream meets a preset image range.

In the embodiments of this application, a constraint condition is introduced during the electronic image stabilization processing, so that output pixels after the electronic image stabilization processing are kept within an effective range of the image, thereby avoiding the problem of incomplete image display.

With reference to the first aspect, in some implementations of the first aspect, the electronic device further includes a Hall sensor, the Hall sensor is configured to collect data of the first anti-shake processing, and the image anti-shake method further includes:

converting the data of the first anti-shake processing into a three-axis offset, where the three-axis offset includes an offset in an X-axis direction, an offset in a Y-axis direction, and a rotation angle in a Z-axis direction; and obtaining the first parameter according to the three-axis offset.

In the embodiments of this application, movement information of the image sensor collected by the Hall sensor is original code, and the unit thereof does not conform to the pixel unit in an intrinsic parameter matrix model, so that the data of the first anti-shake processing collected by the Hall sensor is converted into data in a pixel unit, so that the electronic image stabilization processing can identify the data of the first anti-shake processing, and therefore the first anti-shake processing can be restored.

With reference to the first aspect, in some implementations of the first aspect, the first image stream includes N image frames, N is a positive integer greater than 1, and the converting the data of the first anti-shake processing into a three-axis offset includes:

performing feature point detection on an $(N-1)^{th}$ image frame and an $N^{th}$ image frame, to obtain a feature pair, where the feature pair includes a first feature point in the $(N-1)^{th}$ image frame and a second feature point in the $N^{th}$ image frame, and the first feature point corresponds to the second feature point; and obtaining the three-axis offset according to the feature pair and the data of the first anti-shake processing.

With reference to the first aspect, in some implementations of the first aspect, the shake information includes: rotation data and/or translation data on an X-axis and a Y-axis and rotation data on a Z-axis of the electronic device.

In a possible implementation, an electronic image stabilization module can acquire a frame synchronization signal; and an electronic image stabilization controller acquires the data of the first anti-shake processing of the image sensor and the shake information according to the frame synchronization signal.

It is to be understood that, the frame synchronization signal is for ensuring the consistency of time, that is, ensuring that the time when the Hall sensor collects the data of the first anti-shake processing of the image sensor is consistent with the time when the gyroscope sensor collects the shake information of the electronic device.

In a possible implementation, the first image stream may be processed by using the following formula, so as to obtain a second image stream on which the first anti-shake processing has been restored and the second anti-shake processing has been performed:

$$H = KRK_{ois}^{-1};$$

where H represents an image transformation matrix; K represents a standard camera intrinsic parameter; R represents a three-dimensional angle rotation matrix (an example of a three-dimensional matrix); and $K_{ois}$ represents a camera intrinsic parameter matrix of the three-axis optical image stabilization controller.

$$K_{ois} = \begin{bmatrix} f\cos ois_\theta & -f\sin ois_\theta & center_x + ois_x \\ f\sin ois_\theta & f\cos ois_\theta & center_y + ois_y \\ 0 & 0 & 1 \end{bmatrix};$$

where $K_{ois}$ represents the camera intrinsic parameter matrix of the three-axis optical image stabilization controller; f represents a focal length of the camera; and $ois_\theta$ represents an angle between an optical center of the image sensor and the Z-axis after offset; $center_x+$ $ois_x$ represents a coordinate position of the optical center of the image sensor on the X-axis after offset; $center_x$ represents the position of the optical center of the image sensor on the X-axis; $ois_x$ represents an offset of the optical center of the image sensor on the X-axis after offset; $center_y+ois_y$ represents a coordinate position of the optical center of the image sensor on the Y-axis after offset; $center_y$ represents the position of the optical center of the image sensor on the Y-axis; and $ois_y$ represents an offset of the optical center of the image sensor on the Y-axis after offset.

$$K = \begin{bmatrix} f & 0 & center_x \\ 0 & f & center_y \\ 0 & 0 & 1 \end{bmatrix};$$

where $f$ represents the focal length of the camera; $center_x$ represents the position of the optical center of the image sensor on the X-axis; and $center_y$ represents the position of the optical center of the image sensor on the Y-axis.

It is to be understood that, $K_{ois}$ is obtained based on the movement information of the image sensor; the second anti-shake processing can be realized through the three-dimensional angle rotation matrix R; the image stream can be converted from a two-dimensional coordinate system to a three-dimensional coordinate system through an inverse of $K_{ois}$; and the image stream can be converted from the three-dimensional coordinate system to the two-dimensional coordinate system through the standard camera intrinsic parameter matrix K.

According to a second aspect, an image anti-shake apparatus is provided. The image anti-shake apparatus includes one or more processors, a memory, and a display screen. The memory is coupled to the one or more processors. The memory is configured to store computer program code. The computer program code includes computer instructions. The one or more processors invoke the computer instructions to cause the image anti-shake apparatus to perform the following steps:

enabling a camera application;

receiving a first operation;

acquiring a first image stream in response to the first operation, where the first image stream is an image stream collected by the camera in real time, the first image stream is an image stream that has been subjected to first anti-shake processing, and the first anti-shake processing includes anti-shake processing performed by the three-axis optical image stabilization controller; and processing the first image stream based on a first parameter and a second parameter to obtain a second image stream, where the first parameter is obtained based on the first anti-shake processing, the first parameter is used for restoring the first anti-shake processing, the second parameter is used for second anti-shake processing, and the first anti-shake processing is different from the second anti-shake processing.

With reference to the second aspect, in some implementations of the second aspect, the one or more processors invoke the computer instructions to cause the image anti-shake apparatus to perform the following steps:

restoring the first anti-shake processing on the first image stream based on the first parameter, to obtain a third image stream; and performing the second anti-shake processing on the third image stream based on the second parameter, to obtain the second image stream.

With reference to the second aspect, in some implementations of the second aspect, the electronic device includes a gyroscope sensor, the second parameter is obtained based on shake information collected by the gyroscope sensor, and the shake information is used for representing a pose change of the electronic device during photographing.

With reference to the second aspect, in some implementations of the second aspect, the second parameter is obtained based on the shake information and a constraint condition, and the constraint condition means that each image frame in the second image stream meets a preset image range.

With reference to the second aspect, in some implementations of the second aspect, the electronic device includes a Hall sensor, and the one or more processors invoke the computer instructions to cause the image anti-shake apparatus to perform the following steps:

converting the data of the first anti-shake processing into a three-axis offset, where the three-axis offset includes an offset in an X-axis direction, an offset in a Y-axis direction, and a rotation angle in a Z-axis direction; and obtaining the first parameter according to the three-axis offset.

With reference to the second aspect, in some implementations of the second aspect, the first image sequence includes N image frames, N is a positive integer greater than 1, and the one or more processors invoke the computer instructions to cause the image anti-shake apparatus to perform the following steps:

performing feature point detection on an $(N-1)^{th}$ image frame and an $N^{th}$ image frame, to obtain a feature pair, where the feature pair includes a first feature point in the $(N-1)^{th}$ image frame and a second feature point in the $N^{th}$ image frame, and the first feature point corresponds to the second feature point; and obtaining the three-axis offset according to the feature pair and the data of the first anti-shake processing.

With reference to the second aspect, in some implementations of the second aspect, the shake information includes: rotation data and/or translation data on an X-axis and a Y-axis and rotation data on a Z-axis of the electronic device.

It is to be understood that expansion, limitation, interpretation, and description on related content in the first aspect are also applied to the same content in the second aspect.

According to a third aspect, an electronic device is provided. The electronic device includes one or more processors, a memory, and a display screen, where the memory is coupled to the one or more processors, the memory is configured to store computer program code, the computer program code includes computer instructions, and the one or more processors invoke the computer instructions to cause the electronic device to perform any image anti-shake method in the first aspect.

According to a fourth aspect, a chip system is provided, where the chip system is applied to an electronic device, the chip system includes one or more processors, and the one or more processors are configured to invoke computer instructions to cause the electronic device to perform any image anti-shake method in the first aspect.

According to a fifth aspect, a computer-readable storage medium is provided. The computer-readable storage medium stores computer program code. When the computer program code is run by an electronic device, the electronic device is caused to perform any image anti-shake method in the first aspect.

According to a sixth aspect, a computer program product is provided. The computer program product includes computer program code, and when the computer program code is run by an electronic device, the electronic device is caused to perform any image anti-shake method in the first aspect.

In the embodiments of this application, the first anti-shake processing and the second anti-shake processing may be restored on the first image stream. The first anti-shake processing includes anti-shake processing of the three-axis optical image stabilization controller, and the three-axis optical image stabilization controller can perform correction of the X-axis, the Y-axis, and the Z-axis. Therefore, compared with a two-axis optical image stabilization controller, Z-axis correction is introduced to the three-axis optical image stabilization controller, which can effectively improve the definition of the image sequence; and by performing the second anti-shake processing on the first image stream, a relatively good anti-shake effect can be obtained in a case that the electronic device moves by a relatively large magnitude. Therefore, restoring the first anti-shake processing and the second anti-shake processing on the first image stream can not only improve the definition of the image sequence, but also effectively reduce motion blur in the image, thereby improving the anti-shake effect of the image.

DESCRIPTION OF EMBODIMENTS

The following describes technical solutions in embodiments of this application with reference to the accompanying drawings.

Figure 1:
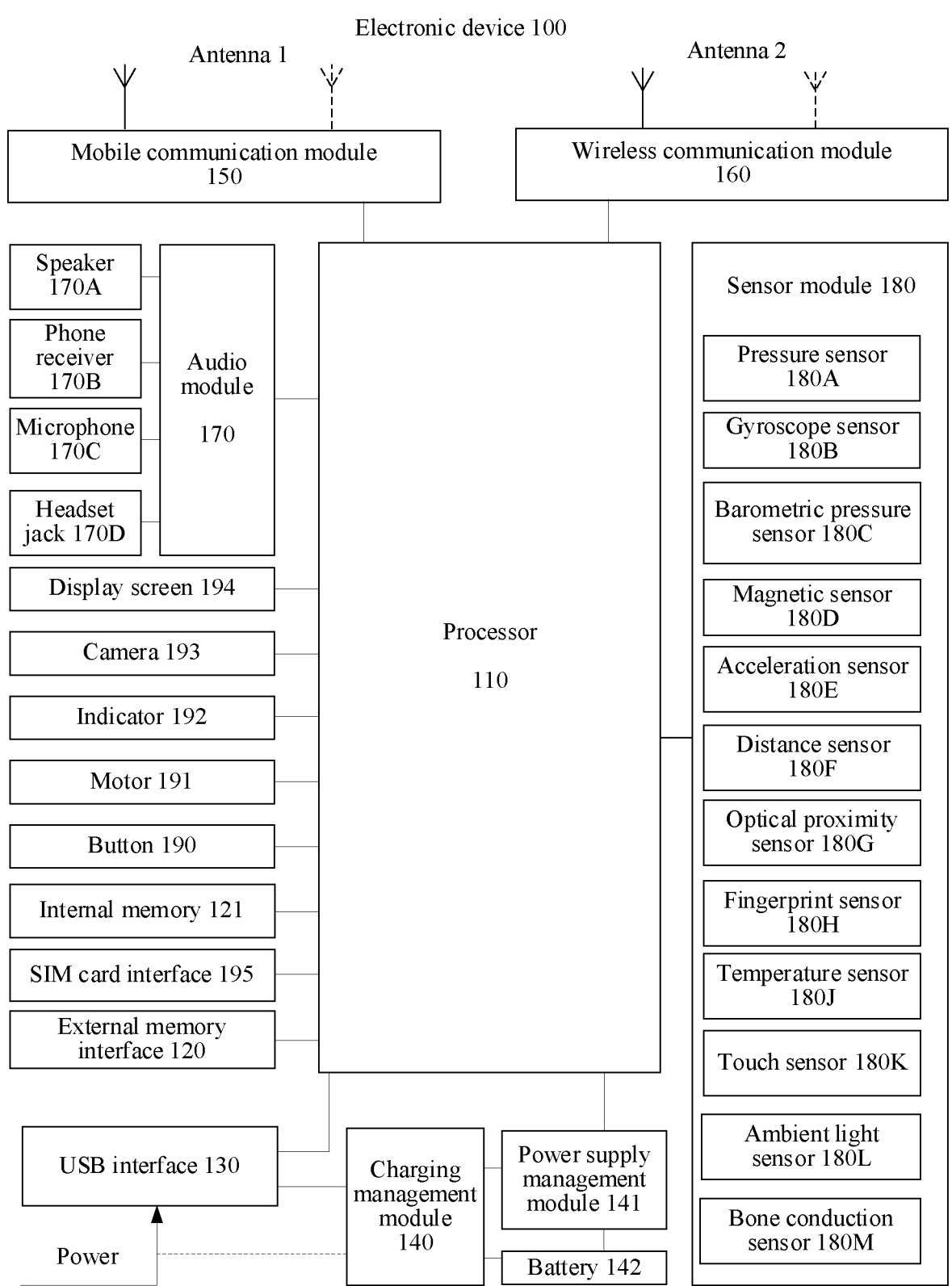
FIG. 1 is a schematic diagram of a hardware system of an electronic device to which this application is applicable.

FIG. 1 shows a hardware system of an electronic device to which this application is applicable.

An electronic device 100 may be a mobile phone, a smart screen, a tablet computer, a wearable electronic device, an in-vehicle device, an augmented reality (AR) device, a virtual reality (VR) device, a notebook computer, an ultramobile personal computer (UMPC), a netbook, a personal digital assistant (PDA), a projector, or the like. A specific type of the electronic device 100 is not limited in embodiments of this application.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, and an audio module 170, a speaker 170A, a phone receiver 170B, a microphone 170C, a headset jack 170D, a sensor module 180, a button 190, a motor 191, an indicator 192, a camera 193, a display screen 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It is to be noted that, the structure shown in FIG. 1 does not constitute a specific limitation on the electronic device 100. In some other embodiments of this application, the electronic device 100 may include more or fewer components than those shown in FIG. 1, or the electronic device 100 may include a combination of some of the components shown in FIG. 1, or the electronic device 100 may include sub-components of some of the components shown in FIG. 1. The components shown in FIG. 1 may be implemented by hardware, software, or a combination of software and hardware.

The processor 110 may include one or more processing unit. For example, the processor 110 may include at least one of the following processing units: an application processor (AP), a modem processor, a graphics processing unit (GPU), an image signal processor (ISP), a controller, a memory, a video codec, a digital signal processor (DSP), a baseband processor, and a neural-network processing unit (NPU). Different processing units may be independent devices, or may be integrated devices.

The controller may generate an operation control signal according to instruction operation code and a time-sequence signal, and control obtaining and executing of instructions.

The processor 110 may be further provided with a memory, configured to store instructions and data. In some embodiments the memory in the processor 110 is a cache memory. The memory may store instructions or data that have just been used or recycled by the processor 110. If the processor 110 needs to use the instructions or the data again, the processor 110 may directly invoke the instructions or the data from the memory, to avoid repeated access and reduce a waiting time of the processor 110, thereby improving system efficiency.

In the embodiments of this application, the processor 110 may perform the following steps: enabling a camera application; receiving a first operation; acquiring a first image stream in response to the first operation, where the first image stream is an image stream collected by the camera in real time, the first image stream is an image stream that has been subjected to first anti-shake processing, and the first anti-shake processing includes anti-shake processing performed by the three-axis optical image stabilization controller; and processing the first image stream based on a first parameter and a second parameter to obtain a second image stream.

The connection relationship between the modules shown in FIG. 1 is merely a schematic description, and does not constitute a limitation on the connection relationship between the modules of the electronic device 100. Optionally, a combination of a plurality of connection manners in the foregoing embodiment may be adopted for the modules of the electronic device 100.

A wireless communication function of the electronic device 100 may be implemented through devices such as the antenna 1, the antenna 2, the mobile communication module 150, the wireless communication module 160, the modem processor, and the baseband processor.

The antenna 1 and the antenna 2 are configured to transmit and receive electromagnetic wave signals. Each antenna in the electronic device 100 may be used to cover one or more communication bands. Different antennas may be further multiplexed to increase antenna utilization. For example, the antenna 1 may be multiplexed as a diversity antenna of a wireless local area network. In some other embodiments, the antennas may be used with a tuning switch.

The electronic device 100 may implement a display function through the GPU, the display screen 194, and the application processor. The GPU is a microprocessor for image processing, and is connected to the display screen 194 and the application processor. The GPU is configured to perform mathematical and geometric calculation, and is configured to render an image. The processor 110 may include one or more GPUs that execute a program instruction to generate or change display information.

The display screen 194 may be configured to display images or videos.

The electronic device 100 may implement a photographing function by using the ISP, the camera 193, the video codec, the GPU, the display screen 194, the application processor, and the like.

The ISP is configured to process data fed back by the camera 193. For example, during photographing, a shutter is enabled. Light is transmitted to a photosensitive element of the camera through a lens, and an optical signal is converted into an electrical signal. The photosensitive element of the camera transmits the electrical signal to the ISP for processing, and the electrical signal is converted into an image visible to a naked eye. The ISP may perform algorithm optimization on noise, brightness, and a color of the image, and the ISP may further optimize parameters such as exposure and a color temperature of a photographing scenario. In some embodiments, the ISP may be disposed in the camera 193.

The camera 193 is configured to capture a static image or a video. An optical image is generated for an object by using the lens and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into a standard image signal in a format such as red green blue (RGB) or YUV. In some embodiments, the electronic device 100 may include 1 or N cameras 193, and N is a positive integer greater than 1.

In the embodiments of this application, the camera 193 may acquire a first image stream.

The digital signal processor is configured to process a digital signal, and in addition a digital image signal, the digital signal processor may also process other digital signals. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of coding formats, for example, moving picture experts group (MPEG) 1, MPEG 2, MPEG 3, and MPEG 4.

The gyroscope sensor 180B may be configured to determine a motion posture of the electronic device 100. In some embodiments, an angular velocity of the electronic device 100 around three axes (that is, an X-axis, a Y-axis, and a Z-axis) may be determined through the gyroscope sensor 180B. The gyroscope sensor 180B may be used for image stabilization in photography. For example, when the shutter is pressed, the gyroscope sensor 180B detects a shaking angle of the electronic device 100, and calculates, based on the angle, a distance that needs to be compensated for by the lens module, so that the lens module counteracts shaking of the electronic device 100 through reverse motion, to implement image stabilization. The gyroscope sensor 180B may also be used in scenarios such as navigation and a motion sensing game.

For example, in embodiments of this application, the gyroscope sensor 180B may be configured to collect shake information, and the shake information may be used for representing a pose change of the electronic device during photographing.

The acceleration sensor 180E may detect acceleration values of the electronic device 100 in all directions (generally, in the X-axis, the Y-axis, and the Z-axis). When the electronic device 100 is stationary, a magnitude and a direction of a gravity may be detected. The acceleration sensor 180E may be further configured to identify an attitude of the electronic device 100 as an input parameter of an application such as switching between landscape orientation and portrait orientation or a pedometer.

The distance sensor 180F is configured to measure a distance. The electronic device 100 may measure a distance by infrared light or laser. In some embodiments, for example, in a photographing scenario, the electronic device 100 may use the distance sensor 180F to measure distance to implement fast focusing.

The ambient light sensor 180L is configured to perceive ambient light brightness. The electronic device 100 can adaptively adjust brightness of the display screen 194 based on the sensed brightness of the ambient light. The ambient light sensor 180L may also be configured to automatically adjust white balance during photographing. The ambient light sensor 180L may further cooperate with the optical proximity sensor 180G to detect whether the electronic device 100 is in a pocket, so as to prevent an accidental touch.

The fingerprint sensor 180H is configured to collect a fingerprint. The electronic device 100 may implement functions, such as unlocking, application lock accessing, photographing, and call answering, by using characteristics of the collected fingerprint.

The touch sensor 180K may also be referred to as a touch device. The touch sensor 180K may be arranged on the display screen 194. The touch sensor 180K and the display screen 194 form a touchscreen, which is also referred to as a touch screen. The touch sensor 180K is configured to detect a touch operation on or near the touch sensor 180K. The touch sensor 180K may transfer the detected touch operation to the application processor, to determine a touch event type. Visual output related to the touch operation may be provided by using the display screen 194. In some other embodiments, the touch sensor 180K may be alternatively arranged on a surface of the electronic device 100, and is located at a position different from that of the display screen 194.

A hardware system of the electronic device 100 is described in detail above, and a software system of the electronic device 100 is described below. A software system may use a layered architecture, an event-driven architecture, a microkernel architecture, a microservice architecture, or a cloud architecture. In the embodiments of this application, the layered architecture is used as an example to describe the software system of the electronic device 100.

Figure 2:
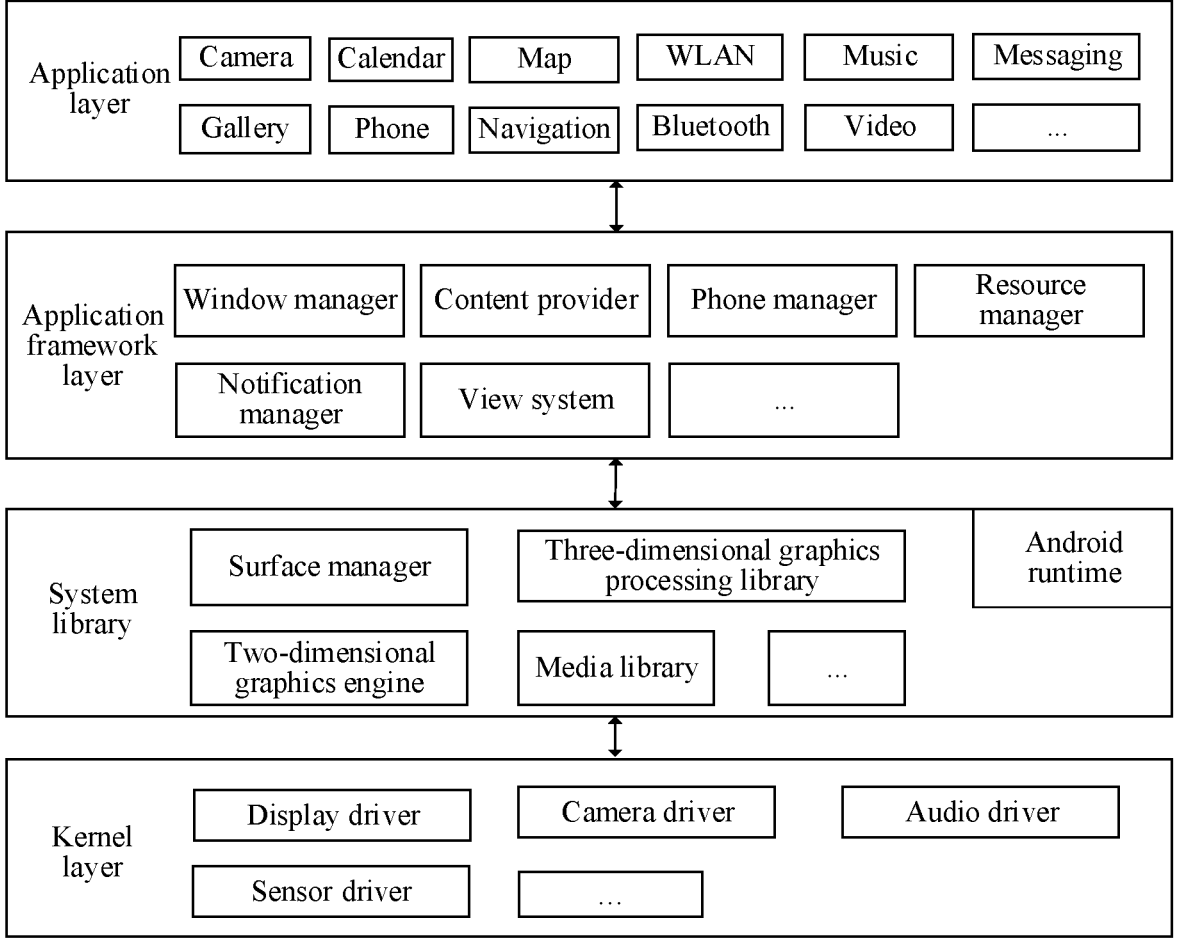
FIG. 2 is a schematic diagram of a software system of an electronic device to which this application is applicable.

As shown in FIG. 2, the software system using the layered architecture is divided into several layers, and each layer has a clear role and task. The layers communicate with each other by using a software interface. In some embodiments, the software system may be divided into four layers: an application layer, an application framework layer, an Android runtime and system library, and a kernel layer from top to bottom.

The application layer may include applications such as Camera, Gallery, Calendar, Phone, Map, Navigation, WLAN, Bluetooth, Music, Video, and Messaging.

The application framework layer provides an application programming interface (API) and a programming framework for applications at the application layer. The application framework layer may include some predefined functions.

For example, the application framework layer includes a window manager, a content provider, a view system, a phone manager, a resource manager, and a notification manager.

The kernel layer is a layer between hardware and software. The kernel layer may include drive modules such as a display driver, a camera driver, an audio driver, and a sensor driver.

The following exemplarily describes a working procedure of a software system and a hardware system of the electronic device 100 with reference to the display of a photographing scenario.

When the user performs a touch operation on the touch sensor 180K, a corresponding hardware interruption is sent to the kernel layer. The kernel layer processes the touch operation into a raw input event, and the raw input event includes information such as touch coordinates and a time-stamp of the touch operation. The original input event is stored in the kernel layer, and the application framework layer obtains the raw input event from the kernel layer, identifies a control corresponding to the raw input event, and notifies an application (APP) corresponding to the control. For example, the touch operation is a tap operation, and an APP corresponding to the control is a camera APP. After the camera APP is awakened by the tap operation, a camera driver at the kernel layer may be invoked by using the API, and the camera driver controls the camera 193 to photograph.

First, technical terms involved in this application are briefly described.

1. Sensor-Shift Technology

The sensor-shift technology refers to a technology of performing shake correction on a camera photographing picture by moving the image sensor inside the camera module.

It is to be understood that, the sensor-shift technology may be used to correct a shake of the camera in a photographing process by moving the image sensor.

2. Calibration

A process of solving a parameter may be referred to as calibration. For example, in the embodiments of this application, optical image stabilization calibration may refer to converting coordinates adopted for motion correction of optical image stabilization into coordinates that can be identified by motion correction of electronic image stabilization.

For example, calibration may refer to converting original code of optical image stabilization collected by the Hall sensor into data in a pixel unit.

3. Motion Blur

In a process of photographing using an electronic device, generation of each frame of image depends on accumulation of photons within an exposure time, the photons are converted into electrons through photoelectric conversion, and the electrons are further transformed into an image that can be identified by human eyes. If the electronic device moves by a relatively large magnitude within this time, motion information is also accumulated and recorded, and a generated image carries an obvious motion blur.

4. Optical Image Stabilization (OIS)

Optical image stabilization may also be referred to as optical image stabilization. An OIS technology refers to that a shake of an electronic device is detected by using a motion sensor (for example, a gyroscope or an accelerometer) during photographing and exposure, and an OIS controller controls, based on shake data detected by the motion sensor, a motor that drives OIS, to move a lens or an image sensor, so that a light path is kept as stable as possible during the entire exposure, and then a clear exposed image is obtained.

5. Electronic Image Stabilization (EIS)

Electronic image stabilization may also be referred to as electronic image stabilization. An EIS technology refers to performing anti-shake processing based on data of a motion sensor, calculating a motion status between image frames in an image sequence based on data of each frame of image collected by the motion sensor during exposure, and correcting motion between the image frames to generate a relatively stable image sequence.

Figure 3:
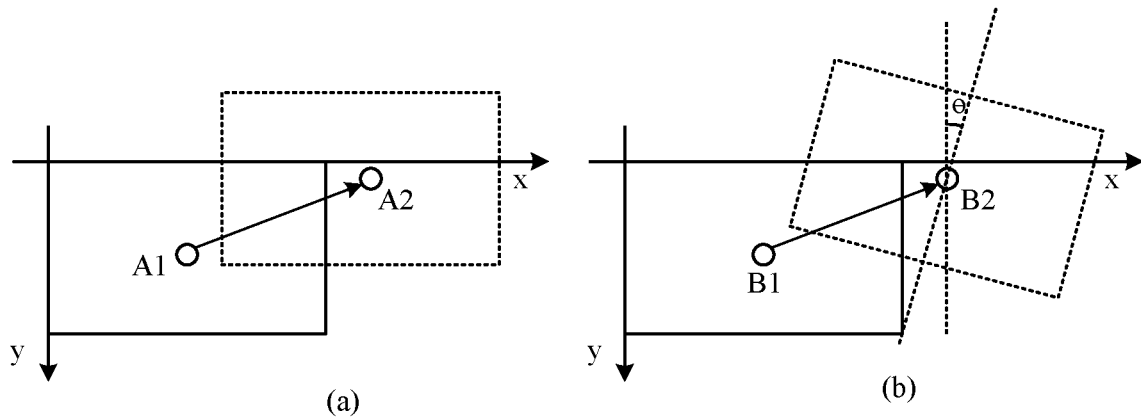
FIG. 3 is a schematic diagram of correction of an optical image stabilization OIS controller according to an embodiment of this application.

The image anti-shake method provided in the embodiments of this application is mainly for a three-axis optical image stabilization controller; and for a movement of the electronic device during photographing, an offset generated by the movement of the electronic device can be corrected by moving the image sensor. As shown in FIG. 3, (a) in FIG. 3 is a schematic diagram of correction of a two-axis optical image stabilization controller. An optical center of the image sensor before the optical image stabilization processing is a point A1, and after the optical image stabilization processing, the optical center of the image sensor is shifted to a point A2. The two-axis optical image stabilization controller can translate the image sensor in directions of the X-axis and the Y-axis in real time, so as to correct the movement of the electronic device during photographing in real time.

(b) in FIG. 3 is a schematic diagram of correction of the three-axis optical image stabilization controller. An optical center of the image sensor before optical image stabilization processing is a point B1 (an example of a first position), and the optical center of the image sensor after optical image stabilization processing is shifted to a point B2 (an example of a second position). A three-axis offset of optical image stabilization data can be obtained based on the optical center point B1 and the optical center point B2. Compared with the correction of the two-axis optical image stabilization controller shown in (a) in FIG. 3, a Z-direction rotation axis is added to the three-axis optical image stabilization controller in the correction process. The three-axis optical image stabilization controller can not only correct the X-axis and the Y-axis, but also correct the Z-axis. Therefore, the three-axis optical image stabilization controller can more effectively correct an offset generated during rotation of the camera.

At present, the introduction of Z-axis correction in the three-axis optical image stabilization controller can effectively improve the definition of an image, but limited by the size of the hardware module, an anti-shake angle of the three-axis optical image stabilization controller is still limited. In a case that the electronic device moves by a relatively large magnitude, an image collected by the electronic device cannot obtain a sufficiently stable anti-shake effect.

In view of this, embodiments of this application provide an image anti-shake method for the three-axis optical image stabilization controller. By performing optical image stabilization processing and electronic image stabilization processing on an image sequence, the definition of the image sequence can be ensured, and motion blur in the image sequence can be effectively reduced, thereby improving the anti-shake effect of the image sequence.

Figure 4:
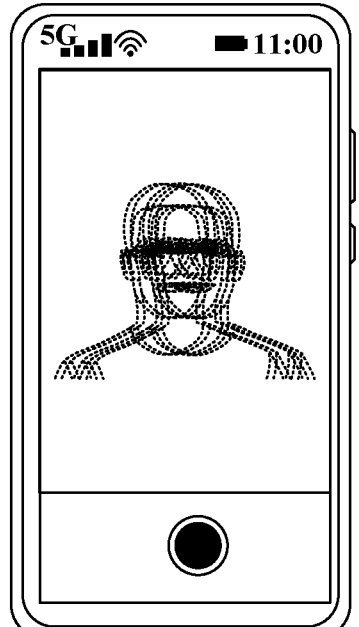
FIG. 4 is a schematic diagram of an application scenario according to an embodiment of this application.
Figure 4:
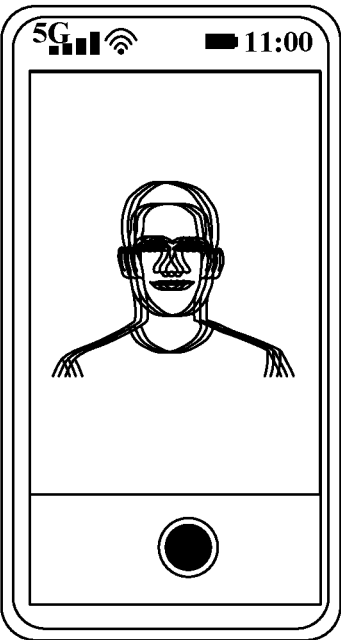
Figure 4:
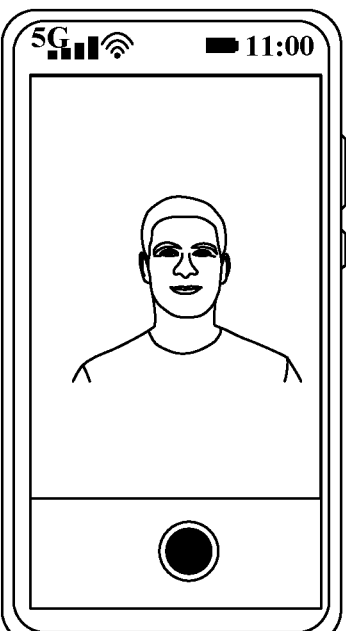

FIG. 4 shows images acquired by the three-axis optical image stabilization controller for a same photographing scenario under different conditions according to an embodiment of this application.

As shown in FIG. 4, (a) in FIG. 4 may represent an image acquired after optical image stabilization and electronic image stabilization are disabled in the electronic device; (b) in FIG. 4 may represent that an image acquired after the optical image stabilization is enabled and the electronic image stabilization is disabled in the electronic device; and (c) in FIG. 4 may represent an image acquired after the optical image stabilization and the electronic image stabilization are enabled in the electronic device. After the optical image stabilization is enabled in the electronic device, the definition of the acquired image is significantly improved. After the optical image stabilization and the electronic image stabilization are enabled in the electronic device, the image sequence can not only maintain a relatively high definition, but also have relatively good stability. By using the image anti-shake method in this application, the image shown in (c) in FIG. 4 can be acquired, which can ensure the definition of the image sequence and effectively improve the stability of the image sequence, thereby improving the image anti-shake effect.

The following describes in detail the image anti-shake method provided in the embodiments of this application with reference to FIG. 5 to FIG. 12.

Figure 5:
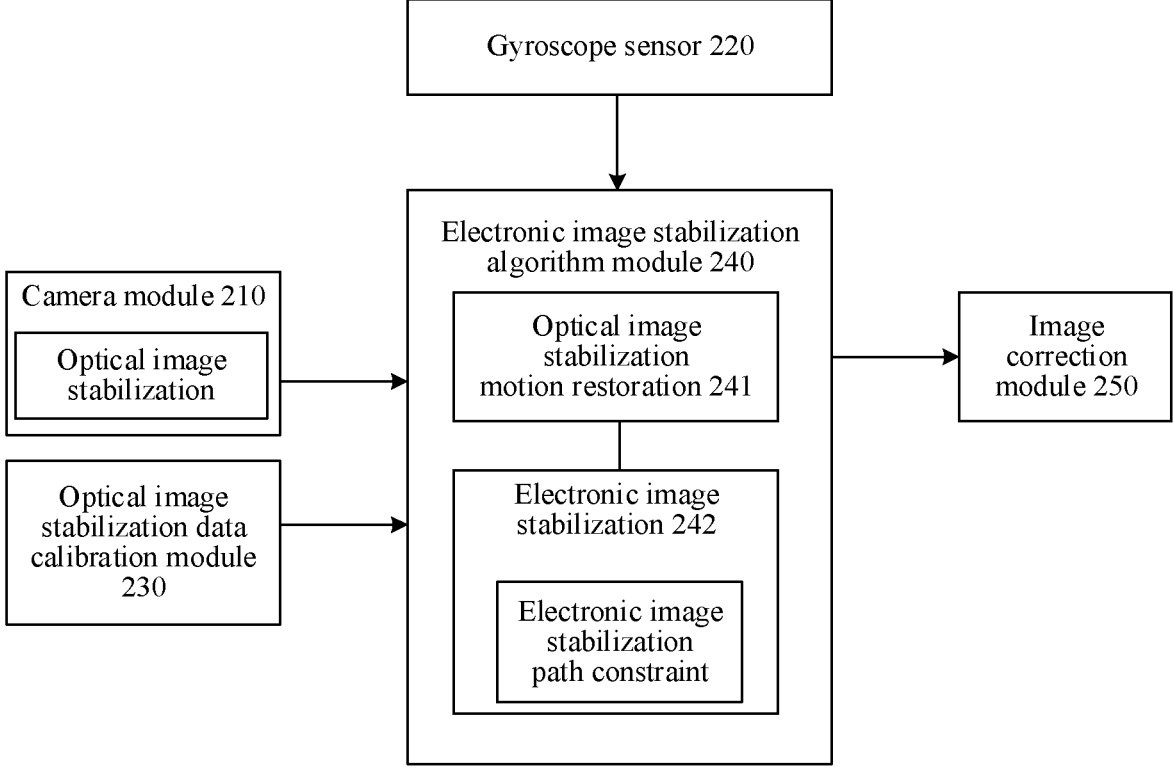
FIG. 5 is a schematic diagram of an image anti-shake method according to an embodiment of this application.

FIG. 5 is a schematic architectural diagram of an image anti-shake method according to an embodiment of this application. The architecture may include a camera module 210, a gyroscope sensor 220, an optical image stabilization data calibration module 230, an electronic image stabilization algorithm module 240, and an image correction module 250.

The camera module 210 includes optical image stabilization. T optical image stabilization means that the three-axis optical image stabilization controller in the camera module performs optical anti-shake processing during photographing. For example, in the video recording mode of the camera, the camera module 210 is configured to perform exposure according to a request of an upper layer application, and acquire an image frame. The image frame is obtained after optical image stabilization processing performed by the three-axis optical image stabilization controller. Therefore, the definition of the image frame on three axes (such as an X-axis, a Y-axis, and a Z-axis) is effectively improved.

For example, the camera module 210 may send acquired image data and acquired optical image stabilization data to the electronic image stabilization algorithm module 240. For example, the camera module 210 may include a Hall sensor, and the optical image stabilization data may refer to original code of optical image stabilization collected by the Hall sensor.

The gyroscope sensor 220 is configured to acquire gyroscope data (an example of shake information) of the electronic device, and send the gyroscope data of the electronic device to the electronic image stabilization algorithm module 240.

Figure 9:
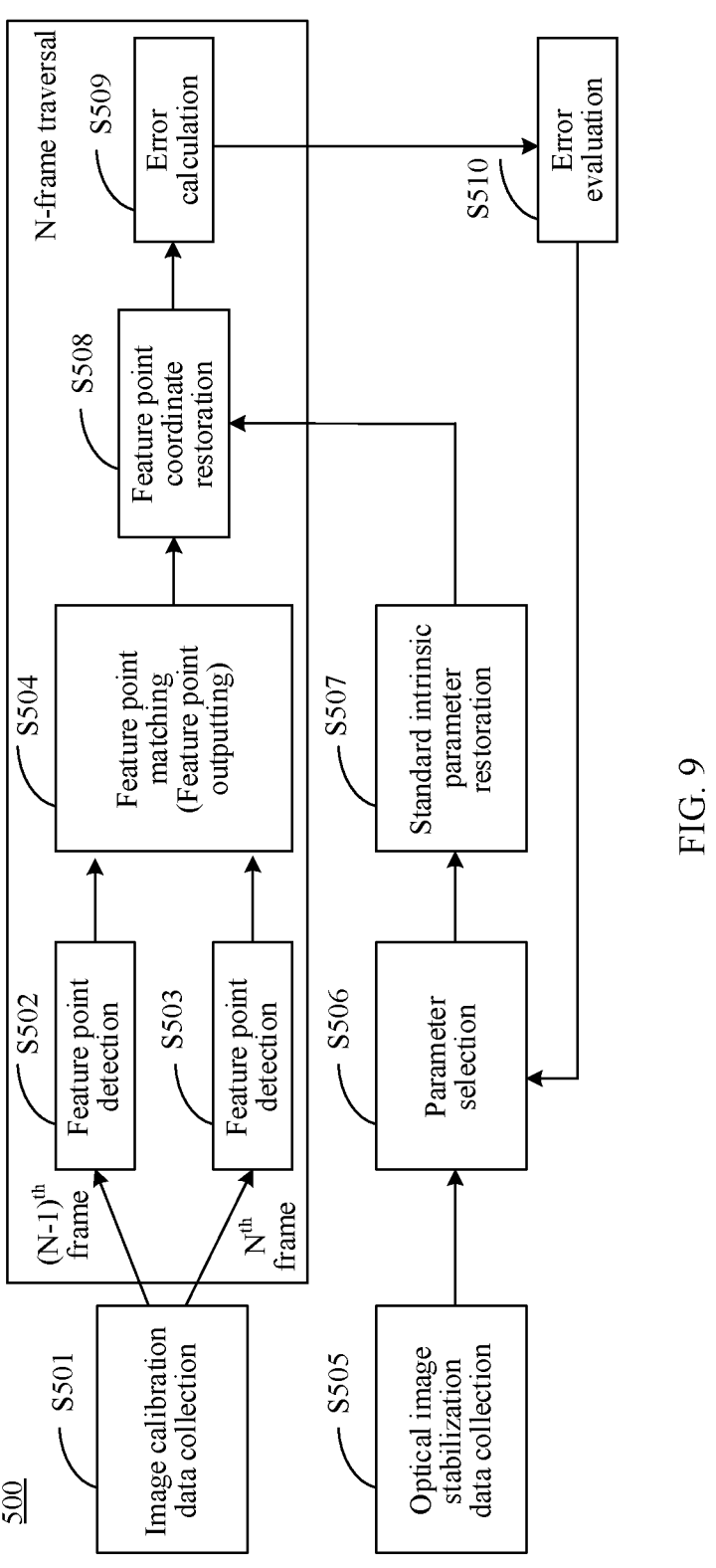
FIG. 9 is a schematic flowchart of an optical image stabilization data calibration method according to an embodiment of this application.

The optical image stabilization data calibration module 230 is configured to calibrate and debug parameters of optical image stabilization, so that the electronic image stabilization algorithm module 240 can identify parameters of the optical image stabilization when performing optical image stabilization motion restoration 241, and restore the optical image stabilization motion according to the parameters. The optical image stabilization calibration module may be configured to perform optical image stabilization data calibration, and the specific process is shown in FIG. 9 below.

The electronic image stabilization algorithm module 240 is configured to execute an electronic image stabilization algorithm. The electronic image stabilization algorithm can increase the anti-shake range of an image. The electronic image stabilization algorithm module 240 may include the optical image stabilization motion restoration 241 and electronic image stabilization 242. The electronic image stabilization 242 includes electronic image stabilization path constraint. The optical image stabilization motion restoration 241 refers to restoring optical image stabilization of the three-axis optical image stabilization controller, and restoring an image to an image that has not been subjected to optical anti-shake processing performed by the three-axis optical image stabilization controller. The electronic image stabilization 242 is used for performing electronic anti-shake processing on a plurality of images obtained after the optical image stabilization motion restoration. In order to avoid the problem of incomplete display of the images outputted after the electronic image stabilization processing, the electronic image stabilization path constraint needs to be met during the electronic image stabilization processing, to ensure that pixel points after the electronic image stabilization processing are within an effective range. The electronic image stabilization path constraint refers to performing path planning on the camera according to gyroscope data when performing the electronic image stabilization algorithm. The objective of the path planning is to find a sufficiently stable camera pose curve to process the plurality of images.

It is to be noted that, because the three-axis optical image stabilization controller also has a certain device anti-shake effect, and image data acquired by the camera module 220 is image data obtained after optical image stabilization processing performed by the three-axis optical image stabilization controller, the electronic image stabilization algorithm cannot be directly superimposed on the optical image stabilization algorithm of the three-axis optical image stabilization controller. Therefore, the optical image stabilization processing performed on the image data by the three-axis optical image stabilization controller needs to be restored during the electronic image stabilization algorithm processing.

The image correction module 250 is configured to correct (warp) an image obtained by the electronic image stabilization algorithm module 240, to obtain an output image, for example, perform processing such as cropping and scaling on the image obtained by the electronic image stabilization algorithm module 240.

Optionally, the optical image stabilization data calibration module 230 may refer to a process of an offline operation. That is, it may be determining parameters of the optical image stabilization in advance through debugging. The process of determining the parameters of the optical image stabilization may be performed in an electronic device, or may be performed in other devices. The electronic image stabilization algorithm module 240 may refer to a process of an online operation. That is, it may refer to processing image data in real time after the camera module 210 acquires the image data. The electronic image stabilization algorithm module 240 may refer to a software module in a processor of the electronic device. The image correction module 250 may refer to a module in the ISP. That is, the process of correcting image data may be performed in the ISP of the electronic device.

Figure 6:
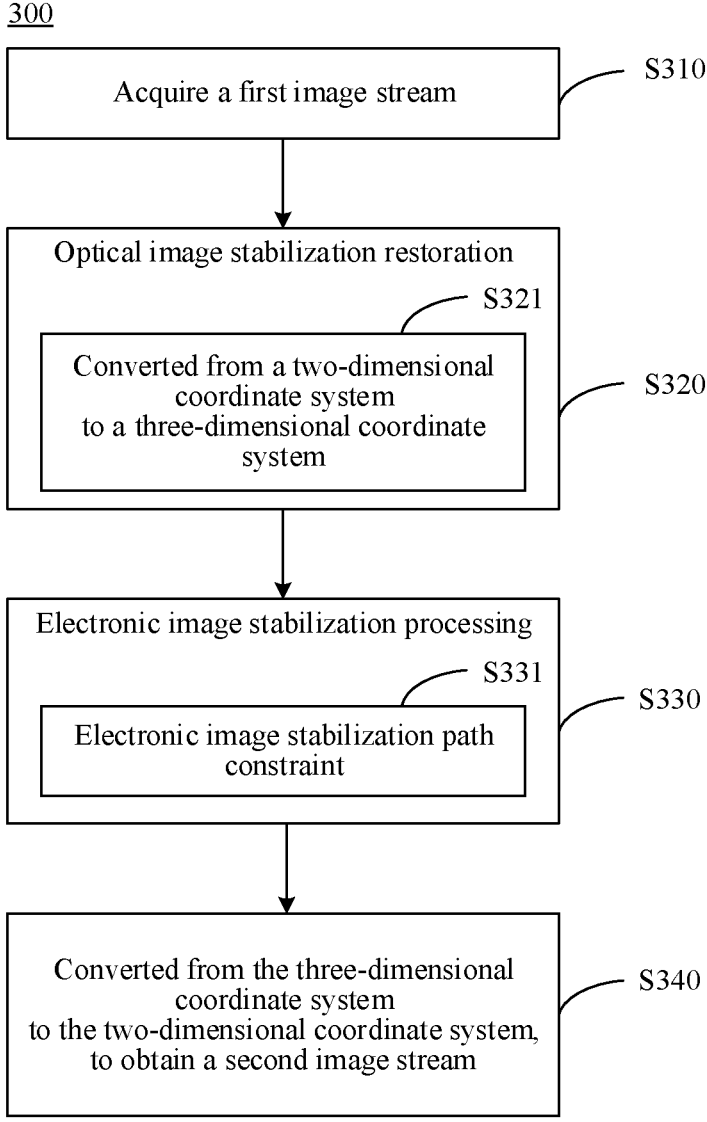
FIG. 6 is a schematic flowchart of an image anti-shake method according to an embodiment of this application.

FIG. 6 is a schematic flowchart of an image anti-shake method according to an embodiment of this application. The method 300 includes step S310 to step S340, and these steps are described in detail respectively below.

Step S310: Acquire a first image stream.

For example, the first image stream may include a plurality of image frames sorted in chronological order. For example, an image stream saved in a memory or a cache includes a plurality of image frames, and the image frames are sorted in chronological order. The first image stream refers to an image stream acquired by a camera module including a three-axis optical image stabilization controller, and the three-axis optical image stabilization controller is configured to perform optical image stabilization processing on the image frames in the first image stream. That is, the acquired first image stream refers to an image stream that has been subjected to optical image stabilization processing (an example of first anti-shake processing).

Step S320: Perform optical image stabilization restoration (an example of restoration of the first anti-shake processing) on the first image stream.

For example, performing optical image stabilization restoration on the first image stream refers to restoring the image frames in the image stream to image frames that have not subjected to optical anti-shake processing.

In the embodiments of this application, step S320 further includes step S321: Convert the image stream from a two-dimensional coordinate system to a three-dimensional coordinate system.

For example, a two-dimensional coordinate system may include a two-dimensional image coordinate system. The two-dimensional image coordinate system is a two-dimensional coordinate system in a unit of pixel.

For example, an image collected by the camera may be stored as an array in the electronic device, and a value of each element (pixel, pixel) in the array is brightness (grayscale) of an image point. A rectangular coordinate system u-v is defined on the image, and coordinates (u, v) of each pixel can respectively represent a column number and a row number of the pixel in the array.

For example, a three-dimensional coordinate system may include a three-dimensional camera coordinate system. The three-dimensional camera coordinate system is a three-dimensional coordinate system with an optical center as an origin.

For example, in the process of converting the image frames in the image stream from the two-dimensional coordinate system to the three-dimensional coordinate system, optical image stabilization restoration is performed on the image frames.

For example, the image frames may be converted from the two-dimensional coordinate system to the three-dimensional coordinate system according to an inverse $$\left(K_{ois}^{-1}\right)$$

of a camera intrinsic parameter matrix of the three-axis optical image stabilization controller, and optical image stabilization restoration may be performed.

The camera intrinsic parameter matrix of the three-axis optical image stabilization controller may be expressed as the following matrix:

$$K_{ois} = \begin{bmatrix} f\cos ois_\theta & -f\sin ois_\theta & center_x + ois_x \\ f\sin ois_\theta & f\cos ois_\theta & center_y + ois_y \\ 0 & 0 & 1 \end{bmatrix};$$

where $K_{ois}$ represents the camera intrinsic parameter matrix of the three-axis optical image stabilization controller; f represents a focal length of the camera; and $ois_\theta$ represents an angle between an optical center of the image sensor and the Z-axis after offset, as shown in (b) in FIG. 3; $center_x + ois_x$ represents a coordinate position of the optical center of the image sensor on the X-axis after offset; $center_x$ represents the position of the optical center of the image sensor on the X-axis; $ois_x$ represents an offset of the optical center of the image sensor on the X-axis after offset; $center_y + ois_y$ represents a coordinate position of the optical center of the image sensor on the Y-axis after offset; $center_y$ represents the position of the optical center of the image sensor on the Y-axis; and $ois_y$ represents an offset of the optical center of the image sensor on the Y-axis after offset.

It is to be noted that, because the image frames refer to image frames obtained after optical image stabilization processing performed by the three-axis optical image stabilization controller, the optical image stabilization processing can be restored through the camera intrinsic parameter matrix of the three-axis optical image stabilization controller, to restore the image frames in the image stream to image frames that have not subjected to optical image stabilization processing.

In the embodiments of this application, the camera intrinsic parameter matrix of the three-axis optical image stabilization controller needs to be acquired during optical image stabilization restoration. Optical image stabilization data refers to original code (code) collected by a Hall sensor, and the unit thereof does not conform to the pixel unit in an intrinsic parameter matrix model, so that during determining of the camera intrinsic parameter matrix of the three-axis optical image stabilization controller, it is necessary to perform data calibration on the optical image stabilization data, and convert the original code into pixel unit data that conforms to the intrinsic parameter matrix model. For the specific process of optical image stabilization data calibration, reference may be made to FIG. 9 below. In addition, data calibration further includes calibration of error data.

The error data may include, but not limited to, a time difference, an angle difference, a center position, and the like. For example, the time difference may refer to a difference between the time when the image sensor collects image frames and the time when the Hall sensor collects the optical image stabilization data; the angle difference may refer to a difference between a rotation angle of the electronic device in a Z-axis direction and an angle at which the Hall sensor collects the optical image stabilization data; and the center position may refer to a center position at which the image sensor collects the image frames.

In the embodiments of this application, because the three-axis optical image stabilization controller has a motion correction function, and the image stream is collected by the camera module including the three-axis optical image stabilization controller, that is, the image stream is an image stream obtained after optical image stabilization processing, the electronic image stabilization processing cannot be directly superimposed on the optical image stabilization processing. Therefore, before electronic image stabilization processing is performed on an image sequence in three dimensions, the image stream needs to be restored to an image stream that has not been subjected to optical image stabilization processing; and the electronic image stabilization processing in step S330 is performed on the image stream on which optical image stabilization processing has been restored.

Step S330: Perform electronic image stabilization processing (an example of the second anti-shake processing) on an image stream restored by the optical image stabilization.

For example, electronic image stabilization processing may refer to performing motion correction on the plurality of image frames in the image stream in a three-dimensional coordinate system; and motion correction may refer to compensating for a coordinate offset of the optical center of the image sensor caused by camera motion.

For example, gyroscope data of the electronic device may be acquired; and electronic image stabilization processing may be performed, according to the gyroscope data, on the image stream restored by the optical image stabilization.

In the embodiments of this application, in order to avoid the problem of incomplete display of the images outputted after the electronic image stabilization processing, the electronic image stabilization path constraint needs to be met during the electronic image stabilization processing, to ensure that pixel points after the electronic image stabilization processing are within an effective range. Therefore, step S330 further includes step S331: Electronic image stabilization path constraint (an example of a constraint condition).

It is to be understood that, the electronic image stabilization path constraint means that the electronic image stabilization processing may be incapable of completely correcting motion information when the camera moves by an excessively large magnitude. In order to ensure that the pixels obtained after electronic image stabilization processing are all effective, it is necessary to control a path of the electronic image stabilization not to deviate from the original path by a relatively long distance; that is, the image obtained after the electronic image stabilization processing is enabled to not exceed a boundary of the effective range through the electronic image stabilization path constraint.

Figure 7:
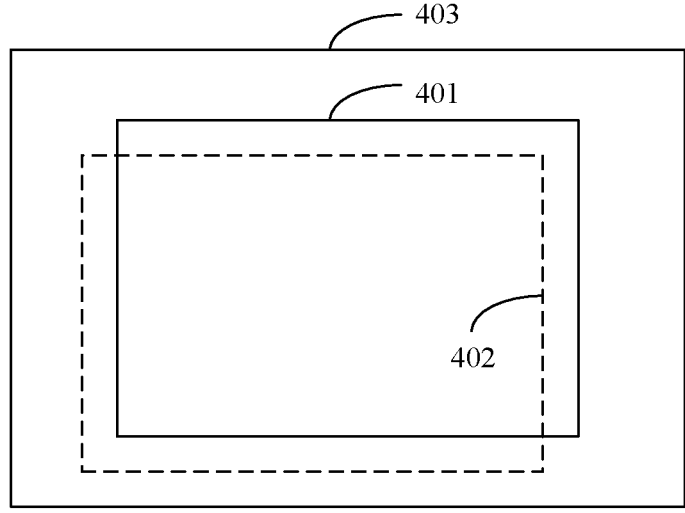
FIG. 7 is a schematic diagram of a path constraint according to an embodiment of this application.

For example, as shown in FIG. 7, 403 may represent a preset effective image range; 401 may represent a fixed image range concentric with 403; 402 represents an output image obtained after image correction processing through the fixed image range 401 and an electronic image stabilization algorithm. The path constraint is for ensuring that the output image 402 is within the effective image range 403.

For example, the size of the fixed image range 401 may be determined based on a magnitude of a focusing ratio of the camera.

For example, the size of the fixed image range 401 may be determined based on a fixed proportional size.

For example, the fixed image range 401 may be 80% of the effective image range 403.

Figure 8:
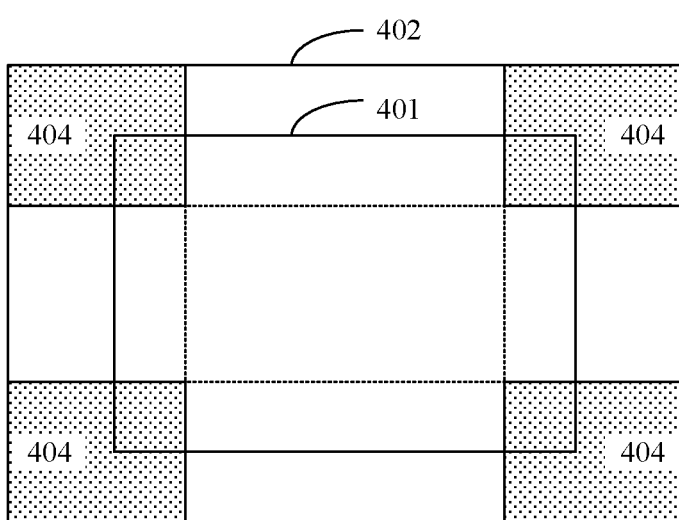
FIG. 8 is a schematic diagram of a path constraint according to an embodiment of this application.

For example, as shown in FIG. 8, during electronic image stabilization path constraint, corner points of the fixed image range 401 may be constrained within the preset effective image range, so as to ensure that the pixels of the output image are effective. For example, four corner points of the fixed image range 401 may be respectively constrained in a rectangle 404, so that the outputted pixels meet the preset effective image range.

For example, the electronic image stabilization path constraint may be expressed as the following equation group:

$$H = KRK_{ois}^{-1}$$

$$P_{in} = HP_{out}$$

$$p_{in} \leq I_{in};$$

where H represents an image transformation matrix; K represents a standard camera intrinsic parameter; R represents a three-dimensional angle rotation matrix; $K_{ois}$ represents a camera intrinsic parameter matrix of the three-axis optical image stabilization controller;

$$K_{ois}^{-1}$$

represents an inverse of the camera intrinsic parameter matrix of the three-axis optical image stabilization controller; $p_{in}$ represents an output image after correction (warp) processing; and $I_{in}$ represents the preset effective image range.

For example, as shown in FIG. 7, In may be shown in 403; $p_{in}$ may be shown in 402, and $p_{out}$ may be shown in 401.

In the embodiments of this application, the three-dimensional angle rotation matrix is configured to perform the electronic image stabilization algorithm, and manners of acquiring the three-dimensional angle rotation matrix may include, but not limited to, the following two manners:

The first manner: The three-dimensional angle rotation matrix is determined according to the electronic image stabilization path constraint and electronic image stabilization path optimization, and the three-dimensional angle rotation matrix is configured to perform step S340, that is, to execute the electronic image stabilization algorithm.

The second manner: A first matrix is assumed, and the first matrix represents a three-dimensional angle rotation matrix obtained through electronic image stabilization path optimization; whether the first matrix meets the path constraint is determined according to the electronic image stabilization path constraint; when the first matrix meets the path constraint, it is determined that the first matrix is configured to perform step S340; and when the first rotation matrix does not meet the path constraint, parameters in the first matrix are adjusted according to the path constraint, so that the first matrix meets the path constraint.

It is to be understood that, step S330 may refer to performing electronic image stabilization path constraint on a single frame of image in the image sequence; and for the single frame of image, pixels of an output image obtained after processing are kept within the effective image range through the electronic image stabilization path constraint.

Optionally, electronic image stabilization path optimization may further be performed on the image sequence, and through the electronic image stabilization path optimization, a position change of a same object in the image sequence can be steady and smooth, thereby improving the stability of the image obtained after anti-shake processing.

For example, the electronic image stabilization path optimization can keep a position of a same object in the image sequence unchanged, or make position changes of a same object in different image frames in the image sequence be the same.

For example, path optimization may refer to smoothing an original pose curve of the entire image sequence, and the original pose curve refers to a curve formed by an identifier of each image frame and a camera pose corresponding to the image frame. Electronic image stabilization path optimization may refer to smoothing the original pose curve to obtain a smoothed curve. During smoothing, the electronic image stabilization path constraint needs to be considered, that is, a pose difference between the smoothed curve and the original pose curve needs to meet an effective range.

For example, the pose difference between the smoothed curve and the original pose curve may be expressed as a matrix R, and an output image $p_{in}$ can be obtained through the equation group in the foregoing step S330, as shown in 402 in FIG. 7. That the electronic image stabilization path constraint needs to be considered during smoothing may refer to that the output image obtained according to the matrix R corresponding to the pose difference needs to meet the preset effective image range. The output image 402 shown in FIG. 7 needs to be ensured to be within the effective image range 403.

For example, for a same image frame, according to the pose difference between the original pose curve and the smoothed curve, a three-dimensional angle rotation matrix for performing step S340 to convert the camera coordinate system can be obtained.

Step S340: Convert the image stream after the electronic image stabilization processing from a three-dimensional coordinate system to a two-dimensional coordinate system, to obtain a second image stream.

For example, the image frame may be converted from the three-dimensional coordinate system to the two-dimensional coordinate system according to the standard camera intrinsic parameter matrix, and an image on which optical image stabilization has been restored and electronic image stabilization processing has been performed may be outputted.

The standard camera intrinsic parameter matrix may be expressed as:

$$K = \begin{bmatrix} f & 0 & center_x \\ 0 & f & center_y \\ 0 & 0 & 1 \end{bmatrix};$$

where $f$ represents the focal length of the camera; $center_x$ represents the position of the optical center of the image sensor on the X-axis; and $center_y$ represents the position of the optical center of the image sensor on the Y-axis.

For example, the following image transformation matrix may be obtained according to a camera intrinsic parameter and motion information in the camera coordinate system, and optical image stabilization processing restoration and electronic image stabilization processing are performed on the acquired first image stream according to the image transformation matrix, to obtain a second image stream after processing.

$$H = KRK_{ois}^{-1};$$

where H represents an image transformation matrix; K represents a standard camera intrinsic parameter; R represents a three-dimensional angle rotation matrix; $K_{ois}$ represents a camera intrinsic parameter matrix of the three-axis optical image stabilization controller.

For example, R may be obtained according to the gyroscope data.

For example, In the embodiments of this application, the first parameter may refer to $$K_{ois}^{-1};$$

and the second parameter may refer to R.

It is to be understood that, the electronic image stabilization processing can be realized through the foregoing three-dimensional angle rotation matrix R; the inverse of $K_{ois}$ can be used for restoring the optical image stabilization; an image in the three-dimensional coordinate system can be converted into an image in the two-dimensional coordinate system through the standard camera intrinsic parameter matrix K; and the foregoing coordinate system conversion process can realize restoration of the optical image stabilization processing of the image sequence.

For example, as shown in (b) in FIG. 3, the optical image stabilization processing may refer to shifting the optical center of the image sensor from a point B1 to a point B2 according to shake information of the electronic device; and restoration of the optical image stabilization processing refers to converting pixel points of the acquired image sequence from a coordinate system corresponding to the point B2 to a coordinate system corresponding to the point B1.

Optionally, the second image stream obtained in step S340 may be saved, or encoded as a video for saving or playing.

In the embodiments of this application, optical image stabilization processing and electronic image stabilization processing are performed on the image sequence collected by the camera module including the three-axis optical image stabilization controller. Because Z-axis correction is introduced to the three-axis optical image stabilization controller, the definition of the image sequence can be effectively improved. By performing electronic image stabilization processing on the image sequence, a relatively good anti-shake effect can be obtained in a case that the electronic device moves by a relatively large magnitude. Therefore, by performing optical image stabilization processing restoration and electronic image stabilization processing on the image sequence, the definition of the image sequence can be improved, and motion blur in the image can be effectively reduced, thereby improving the anti-shake effect of the image.

FIG. 9 is a schematic flowchart of an optical image stabilization data calibration method according to an embodiment of this application. The method 500 includes step S501 to step S510, and these steps are described in detail respectively below.

Step S501: Image calibration data collection.

For example, the image calibration data refers to images collected when the electronic image stabilization algorithm of the electronic device needs to be disabled and the optical image stabilization thereof needs to be enabled.

For example, a plurality of frames of images may be acquired in the collection process. It is assumed that N frames of images are acquired, where N is a positive integer greater than 1.

Step S502: Feature point detection.

For example, step S502 refers to performing feature point detection on the collected $(N-1)^{th}$ frame of image.

For example, the feature point detection is a concept in computer vision and image processing. The feature point detection refers to calculation processing on an image, and a feature point refers to a point of which an image gray value changes drastically or a point having a relatively large curvature on an image edge.

Step S503: Feature point detection.

For example, step S503 refers to performing feature point detection on the collected $N^{th}$ frame of image.

For example, the foregoing algorithm adopted for feature point detection on the image may include, but not limited to: an ORB algorithm, a Harris corner point, and the like.

Step S504: Feature point matching and feature pair outputting.

For example, a feature pair may refer to a set of feature points at same positions or similar positions in two image frames; and one feature pair may include two feature points.

For example, by traversing every two frames of images in a video, feature detection is performed on the images; and matching and screening are performed on feature points, where screening may refer to removing some feature points in the image that do not meet requirements or have poor imaging.

For example, feature point matching is performed on the first feature point in the $(N-1)^{th}$ frame of image and the second feature point in the $N^{th}$ frame of image to obtain a feature pair, where the first feature point may refer to any feature point in the $(N-1)^{th}$ frame of image, and the second feature point refers to a feature point in the $N^{th}$ frame of image that matches the first feature point.

Step S505: Optical image stabilization data (an example of data of the first anti-shake processing) collection.

For example, the optical image stabilization data may be motion correction information of the optical image stabilization collected by the Hall sensor.

For example, the motion correction information includes an X-axis movement distance of optical image stabilization, a Y-axis movement distance of optical image stabilization, a rotation angle of optical image stabilization, and a timestamp of optical image stabilization. The rotation angle of optical image stabilization may refer to that affected by a device assembly error and driving, the axis center of Z-axis correction of an optical image stabilization module may not be completely the image center, and the position of the center of the rotation axis needs to be calibrated. The timestamp of optical image stabilization refers to that an optical image stabilization data source is inconsistent with an image data source. Under the same timestamp, the movement represented may have a certain phase difference.

The phase difference is generally constant, and this value also needs to be obtained through image calibration.

It is to be understood that, the motion correction information is described above by using an example. The motion correction information may further include other possible error values, which is not limited in this application.

Step S506: Parameter selection.

The parameter selection may refer to determining a set of scaling coefficients in a functional relationship. The functional relationship is used for optical image stabilization processing. The original code outputted by the Hall sensor is processed according to the functional relationship, and a camera intrinsic parameter matrix of optical image stabilization corresponding to an image frame can be obtained.

It is to be understood that, a plurality of image frames in one video correspond to a same functional relationship.

For example, a set of parameters for optical image stabilization may be determined through a parameter search algorithm.

For example, a set of parameters for optical image stabilization may be determined through an AutoML algorithm.

Step S507: Standard intrinsic parameter restoration.

For example, standard intrinsic parameter restoration refers to determining an inverse, that is, $$K_{ois(N-1)}^{-1},$$

of the camera intrinsic parameter matrix of the optical image stabilization corresponding to the $(N-1)^{th}$ frame of image according to a set of parameters determined in step S506 and the original code of the optical image stabilization corresponding to the $(N-1)^{th}$ frame of image.

Step S508: Feature point coordinate restoration.

For example, feature point coordinate restoration is performed through the following formula:

$$H_{N-1 \sim N} = K_{ois(N)} R_{(N-1 \sim N)} K_{ois(N-1)}^{-1};$$

where $H_{N-1 \sim N}$ represents an image transformation matrix between the $(N-1)^{th}$ frame of image and the $N^{th}$ frame of image; $K_{ois(N)}$ represents a camera intrinsic parameter matrix of the optical image stabilization corresponding to the $N^{th}$ frame of image; $R_{(N-1 \sim N)}$ represents a matrix corresponding to a gyroscope pose difference between the $(N-1)^{th}$ frame of image and the $N^{th}$ frame of image acquired by the gyroscope; and $$K_{ois(N-1)}^{-1}$$

represents an inverse of the camera intrinsic parameter matrix of the optical image stabilization corresponding to the $(N-1)^{th}$ frame of image. $K_{ois(N)}$ is obtained according to the set of parameters determined in step S506 and the original code of the optical image stabilization corresponding to the $N^{th}$ frame of image; and $$K_{ois(N-1)}^{-1}$$

is obtained according to the set of parameters determined in step S506 and the original code of the optical image stabilization corresponding to the $(N-1)^{th}$ frame of image.

For example, through feature point matching and feature pair outputting in step S504, it can be obtained that a feature point (0, 0) in the $(N-1)^{th}$ frame of image and a feature point (5, 5) in the $N^{th}$ frame of image are a feature pair; and through step S507, a corresponding feature point in the $N^{th}$ frame of image can be deduced to be (4, 4) according to the feature point (0, 0) in the $(N-1)^{th}$ frame of image.

Step S509: Error calculation.

The error calculation refers to calculating a coordinate information difference of feature points according to a feature pair and coordinate information restored from feature point coordinates.

For example, it is determined based on feature point matching that a feature pair is the feature point (0, 0) in the $(N-1)^{th}$ frame of image and the feature point (5, 5) in the $N^{th}$ frame of image. Through feature point coordinate restoration, a corresponding feature point in the $N^{th}$ frame of image can be deduced to be (4, 4) according to the feature point (0, 0) in the $(N-1)^{th}$ frame of image. Error calculation refers to calculating a difference between the feature point (5, 5) and the feature point (4, 4).

For example, error calculation may be performed on coordinate information obtained by restoring feature point coordinates and coordinate information of an outputted feature pair according to a mean square error (MSE) algorithm.

Step S510: Error evaluation.

For example, a preset threshold may be set; when an error is greater than the preset threshold, it can indicate that the set of parameters determined in step S506 is inaccurate; and when the error is less than the preset threshold, it can indicate that the set of parameters determined in step S506 is accurate.

It is to be noted that, for the set of parameters determined in step S506, any two adjacent image frames in the N frames of images in the video may be traversed, to perform error evaluation on the set of parameters.

It is to be understood that, if the set of optical image stabilization parameters determined in step S506 is accurate, coordinates of feature points obtained from feature point restoration and the feature points in the outputted feature pair should completely coincide with each other. After an error value corresponding to a set of parameters is obtained, a set of parameters may be re-determined and then an error value may be calculated, and this cycle is repeated until a set of parameters that minimizes a cumulative error of the video is found.

For example, through the foregoing steps S502 to S504, content information of image frames may be modeled to obtain a camera pose curve represented by images; through steps S505 to S508, a camera intrinsic parameter model may be modeled based on optical image stabilization data and gyroscope data to obtain a camera pose curve represented by motion sensor data; and the principle of parameter calibration is that the foregoing two curves are matched to obtain an optimal set of parameters, and the optimal set of parameters can make the two curves be closest.

It is to be understood that, according to error evaluation in step S510, whether a set of parameters obtained through parameter selection in step S506 is optimal parameters can be determined. If it is determined based on error evaluation in step S510 that the set of parameters does not meet an error requirement, step S506 to step S510 may be re-performed to obtain a new set of parameters for error evaluation, until an optimal set of parameters meeting the error evaluation is determined. After obtaining the optimal set of parameters, conversion of a certain ratio may be performed on the original code collected by the Hall sensor according to the set of parameters, to convert the optical image stabilization data collected by the Hall sensor into data meeting the pixel unit in the intrinsic parameter matrix.

Figure 10:
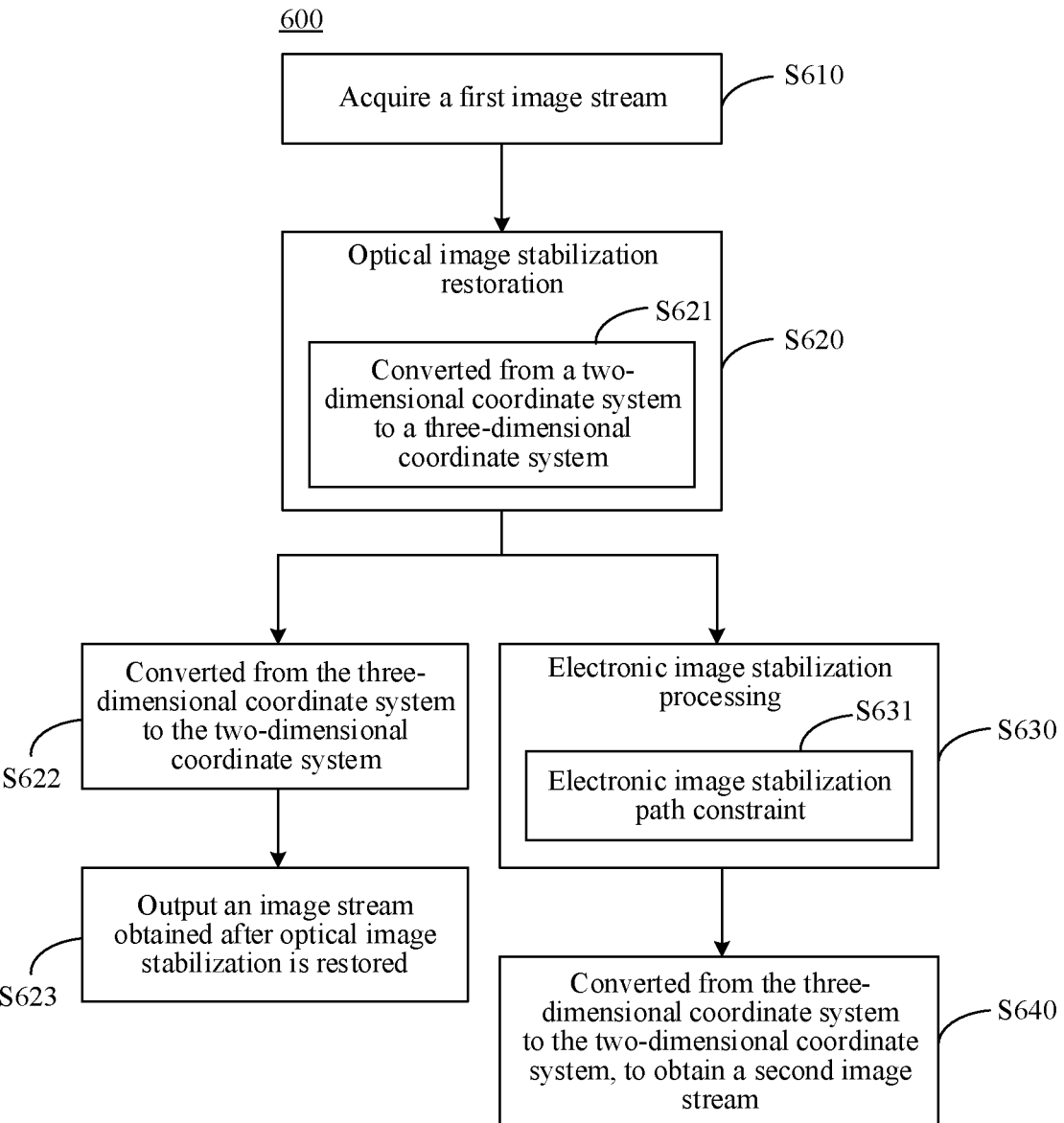
FIG. 10 is a schematic flowchart of offline data calibration according to an embodiment of this application.

FIG. 10 is a schematic flowchart of an image anti-shake method according to an embodiment of this application. The method 600 includes step S610 to step S640, and these steps are described in detail respectively below.

It is to be understood that, the difference between the image anti-shake methods shown in FIG. 10 and FIG. 6 is that in the image anti-shake process shown in FIG. 6, no image stream on which optical image stabilization has been restored is outputted, but a second image stream on which optical image stabilization has been restored and electronic image stabilization processing has been performed is directly outputted; and in the image stabilization process shown in FIG. 10, an image stream on which optical image stabilization has been restored may be outputted. The description of the same steps in FIG. 6 is also applicable to the same parts in FIG. 10, and details are not described herein again.

Step S610: Acquire a first image stream.

Step S620: Perform optical image stabilization restoration on the first image stream.

For example, step S620 includes step S621: Converted from a two-dimensional coordinate system to a three-dimensional coordinate system.

Step S622: Convert the first image stream after the optical image stabilization restoration from the three-dimensional coordinate system to the two-dimensional coordinate system.

Step S623: Output an image stream obtained after optical image stabilization is restored (an example of a third image stream).

Step S630: Perform electronic image stabilization processing on the image stream restored by the optical image stabilization.

For example, step S630 includes step S631: Electronic image stabilization path constraint.

Step S640: Convert the image stream after the electronic image stabilization processing from the three-dimensional coordinate system to the two-dimensional coordinate system, to obtain a second image stream.

Optionally, other processing (such as demosaicing) may be performed on the image stream obtained in step S623, and the image stream may alternatively be saved, or encoded as a video for saving or playing.

Optionally, the second image stream obtained in step S640 may be saved, or encoded as a video for saving or playing.

For example, in a recording/preview scenario, the module device includes OIS (optical image stabilization) of a three-axis Sensor Shift model. Compared with OIS of a conventional Sensor Shift model, a rotation axis is added to the OIS of the three-axis Sensor Shift model adapted to the camera module, which can improve the stabilization effect and the definition of the Z-axis, but the overall anti-shake angle is still limited by the size of the module and the OIS device, and consequently the anti-shake effect thereof is not as good as the anti-shake effect of the EIS algorithm in a case of large-angle motion (for example, running). In order to further improve the anti-shake effect of this device while retaining the advantages of the OIS on the Z rotation axis, this patent provides an OIS+EIS solution for the OIS of the three-axis Sensor Shift model.

This application provides a three-axis Sensor Shift OIS+ EIS solution (online anti-shake and offline calibration). The OIS module is in a sensor shift working mode, and has three correction axes, which are respectively expressed as x-axis translation, y-axis translation, and z-axis rotation. The amounts of translation and rotation of the OIS module are recorded in real time through the Hall sensor, and the compensation amount is transmitted to the EIS software algorithm through the ISP. The EIS algorithm receives data from the gyroscope sensor, the OIS Hall sensor, the image sensor, and the like, and performs, according to data of a motion information sensor, shake compensation on an image sequence generated by the image sensor. The EIS algorithm performs shake compensation according to a displacement and an angle transmitted by the OIS Hall sensor, to restore the motion of the OIS device to motion under a standard camera. The EIS algorithm performs auxiliary path planning according to the displacement and the angle transmitted by the OIS Hall sensor, and performs image shake compensation at a large angle based on collection, movement, and deformation of the image sequence. The anti-shake capability of the OIS+EIS algorithm is controlled by adjusting a cropping range of the image sequence, and a larger cropping range of the image sequence indicates a stronger anti-shake capability of the OIS+EIS algorithm.

First: Introduction to OIS of the Three-Axis Sensor Shift Model.

In a process of video recording using a camera of a mobile phone, generation of each frame of image depends on accumulation of photons within an exposure time, the photons are converted into electrons through photoelectric conversion, and the electrons are further transformed into an image that can be identified by naked eyes. If the camera moves by a relatively large magnitude within this time, motion information is also accumulated and recorded, and a generated image carries an obvious motion blur.

OIS can effectively deal with the foregoing motion blur problem through real-time correction of hardware. The OIS of the conventional sensor shift model is shown on the left side of the figure above. The OIS module of this model corrects motion of a mobile phone module in the process of video shooting and exposure in real time by translating the image sensor in the X-axis direction and the Y-axis direction, which can improve the inter-frame definition.

However, a defect of the conventional OIS module is that the rotation blur generated during rotation of the camera module cannot be processed. A more effective device is OIS of the three-axis Sensor Shift model shown on the right side if the figure. AZ-direction rotation axis is added to the OIS of this model, which can more effectively correct the motion blur during rotation of the camera.

Second: Introduction to a Three-Axis Sensor Shift OIS+EIS Solution (Online Anti-Shake, Offline Calibration).

Although the foregoing three-axis OIS model can effectively improve the definition of the rotation axis, but limited by the size of the hardware module, the anti-shake angle of this OIS is still limited, and a sufficiently stable anti-shake effect cannot be obtained for large-scale movements.

Conventional EIS software anti-shake can further improve the anti-shake effect by cropping of frames, but there is still no OIS+EIS solution for this type of three-axis Sensor Shift OIS model at present. This patent provides a new OIS+EIS solution, which can perform software and hardware joint anti-shake for this type of OIS model, and greatly improve the anti-shake effect while ensuring the definition gain of the rotation axis.

Figure 11:
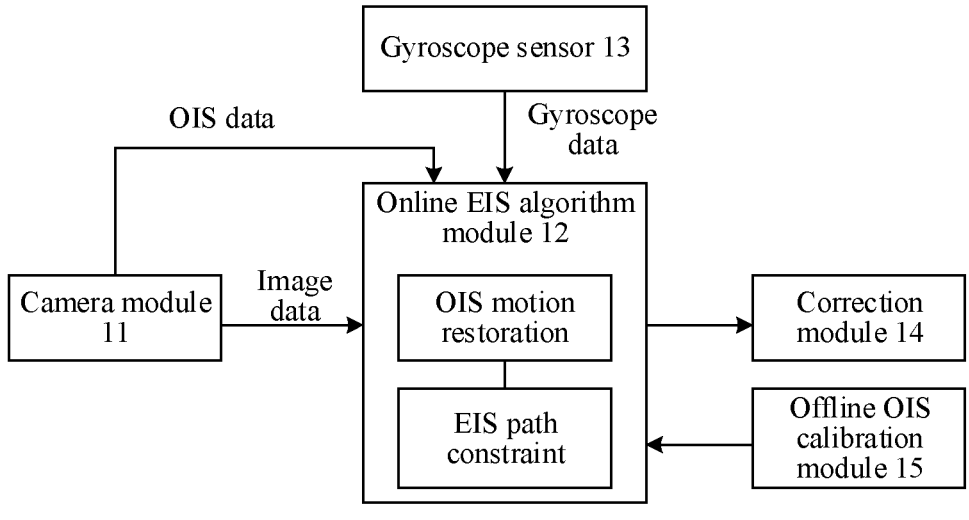
FIG. 11 is a schematic diagram of an OIS+EIS algorithm software combination solution (online anti-shake, offline calibration) according to an embodiment of this application.

FIG. 11 is a schematic diagram of a software and hardware combination solution of OIS+EIS.

The camera module 11 is a hardware module, which represents a camera module with OIS of a three-axis Sensor Shift model, and can perform exposure according to a request of an upper application in the video recording mode of the camera, to generate a new image frame. The frame is generated after OIS hardware anti-shake, and the three-axis definition is effectively improved.

The online EIS algorithm module 12 is a software module, and represents an EIS anti-shake algorithm (EIS: electronic image stabilization). The algorithm can increase the image anti-shake range, and the anti-shake effect thereof is better than that of OIS. The EIS algorithm needs to plan the path of the camera according to the gyroscope data when performing anti-shake, and the objective is to find a sufficiently stable camera pose curve and perform correction. However, when an image transmitted by the camera module is an image generated by OIS motion, two parts need to be additionally considered in this process: restoring the motion of the OIS device, and taking the motion of OIS into consideration of the path planning of EIS.

The gyroscope sensor 13 is a hardware module, represents a gyroscope sensor, and can continuously transmit gyroscope data to the EIS algorithm.

The correction module 14 is a hardware module (which may be a software method in some scenarios), and its main function is to perform warp according to a calculation result of the EIS to obtain an image after anti-shake.

The off-line OIS calibration module 15 is an off-line software module, and its main function is to calibrate and debug OIS parameters, so that OIS and EIS fit each other perfectly.

Third: Introduction to OIS+EIS (Online Anti-Shake): OIS Motion Restoration.

Figure 12:
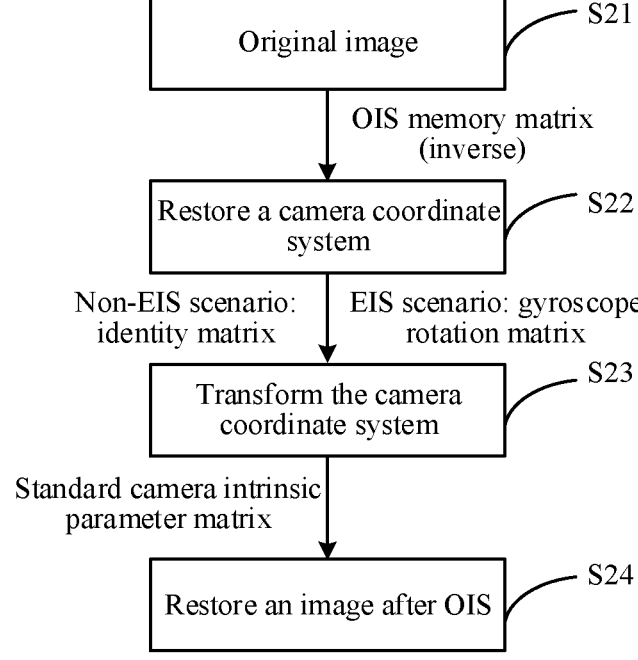
FIG. 12 is a schematic flowchart of OIS motion restoration according to an embodiment of this application.

FIG. 12 is a flowchart of performing OIS motion restoration on EIS. In the three-axis OIS+EIS solution, the main function of OIS is to improve the inter-frame definition under three-axis motion, while EIS improves the anti-shake effect of the overall solution.

Because OIS also has a certain device anti-shake effect, the anti-shake effects of OIS and EIS cannot be directly superimposed. In an actual solution, the motion of OIS will be first restored to the effect of no anti-shake, and then the large-angle EIS anti-shake will be performed. This part is the OIS motion restoration process.

The OIS motion restoration formula is as follows:

$$H = KRK_{ois}^{-1};$$

where $$K_{ois}^{-1}$$

is used for step S21 and step S22; R is used for representing step S22 and step S23; and K is used for step S23 and step S24.

In the above formula $$H = KRK_{ois}^{-1},$$

the transformation matrix may perform pose transformation on pixels in an input image according to a camera intrinsic parameter and motion information in the camera coordinate system, to obtain a new image.

Step S21: Acquire an original image.

Step S22: Restore a camera coordinate system.

For example, original OIS two-dimensional image coordinates are converted into a three-dimensional world coordinate system (without depth information). In the restoration, the conversion needs to be performed according to the camera intrinsic parameter matrix in an OIS motion state. The specific transformation matrix and the intrinsic parameter difference of the OIS three-axis model are as follows.

Step S23: Transform the camera coordinate system.

For example, in the three-dimensional coordinate system (for example, an EIS scenario), the motion correction information of the EIS is generally a three-dimensional rotation matrix obtained through calculation based on gyroscope information, that is, a gyroscope rotation matrix. In scenarios in which only OIS motion is restored (for example, a non-EIS scenario), this value is an identity matrix.

Step S24: Restore an image after OIS.

For example, motion in the three-dimensional coordinate system is restored to a two-dimensional standard intrinsic parameter image coordinate system. The transformation matrix used in this process is the standard intrinsic parameter matrix. The specific transformation matrix is as follows, which means that the image generated under the OIS module has been restored to an image under a standard camera (no OIS).

Fourth: Introduction to OIS+EIS (Online Anti-Shake): EIS Path Constraint.

The standard camera intrinsic parameter and a camera intrinsic parameter under OIS correction are as follows:

$$K = \begin{bmatrix} f & 0 & center_x \\ 0 & f & center_y \\ 0 & 0 & 1 \end{bmatrix} \rightarrow K_{ois} = \begin{bmatrix} f\cos ois_\theta & -f\sin ois_\theta & center_x + ois_x \\ f\sin ois_\theta & f\cos ois_\theta & center_y + ois_y \\ 0 & 0 & 1 \end{bmatrix}$$

where K represents a standard camera intrinsic parameter matrix, $f$ represents the focal length of the camera; $center_x$ represents the position of the optical center of the image sensor on the X-axis; $center_y$ represents the position of the optical center of the image sensor on the Y-axis; $K_{ois}$ represents the camera intrinsic parameter matrix of the three-axis optical image stabilization controller; $f$ represents a focal length of the camera; $ois_\theta$ represents an angle between an optical center of the image sensor and the Z-axis after offset, as shown in (b) in FIG. 3; $center_x + ois_x$ represents a coordinate position of the optical center of the image sensor on the X-axis after offset; $center_x$ represents the position of the optical center of the image sensor on the X-axis; $ois_x$ represents an offset of the optical center of the image sensor on the X-axis after offset; $center_y + ois_y$ represents a coordinate position of the optical center of the image sensor on the Y-axis after offset; $center_y$ represents the position of the optical center of the image sensor on the Y-axis; and $ois_y$ represents an offset of the optical center of the image sensor on the Y-axis after offset.

For example, during path planning of EIS, it is also necessary to consider the correction of OIS. Because the correction of OIS will occupy a part of the anti-shake range of EIS, the path planned by EIS changes. OIS correction is mainly effective in the path constraint item in EIS path planning. The specific form is that: after-warp coordinates of coordinates of each corner point of the output image obtained after OIS restoration and gyroscope motion correction need to be constrained to the range of the original input image.

For example, as shown in the EIS corner point constraint range diagram shown in FIG. 8, when the EIS performs path planning, in order to ensure that the pixels in the output map are effective, it is necessary to control the path optimized by EIS not to deviate from the original path by an excessively distance. The manner adopted in this patent solution is to control the four corner points of the output image to be within a certain range of motion. The coordinates of each corner point need to meet the following three formulas:

image EIS correction matrix:

$$H = KRK_{ois}^{-1};\qquad\qquad\text{(Formula 1)}$$

image warp to input: $p_{in} = Hp_{out}$ (Formula 2);

constrained within the input image: $p_{in} \leq I_{in}$ (Formula 3).

Formula 1 is a path optimization matrix of OIS restoration+EIS, and for detailed explanation, reference may be made to the foregoing description. Formula 2 represents the warp operation of the corner points of the image, and the warp adopts a reverse mapping method, in which index is from output to input. Formula 3 indicates that the output image index points should meet the corner point constraint range.

Fifth: Introduction to OIS+EIS (Offline Calibration): OIS Parameter Calibration.

The specific data structure of OIS and the calibration reason are as follows:

1. X-axis movement distance of OIS: The EIS algorithm needs to calculate the value in the principal point position of the OIS intrinsic parameter matrix, but the OIS output data is the original code transmitted by the Hall sensor in the OIS module, and its unit does not conform to the pixel unit in the intrinsic parameter matrix model. Conversion of a certain ratio needs to be performed. The conversion varies with specific modules and operations such as path image scaling. Therefore, when this value is used in the EIS algorithm, it is necessary to perform offline calibration on the scaling factor and investigate its parameters online.

2. Y-axis movement distance of OIS: the reason for the Y-axis distance calibration is the same as above.

3. Rotation angle of OIS (calibration of axis center deviation value): Affected by a device assembly error and driving, the axis center of z-axis correction of an OIS module may not be completely the image center, and the position of the center of the rotation axis needs to be calibrated.

4. Timestamp of OIS (calibration of a deviation value): An OIS data source is inconsistent with an image data source. Under the same timestamp, the movement represented may have a certain phase difference. The phase difference is generally constant, and this value also needs to be obtained through image calibration.

Calibration Principle:

The foregoing calibration method of the parameters mainly aligns the image content with the OIS/gyro data through parameter search.

A camera pose curve represented by images can be obtained by modeling the content of the video frames, and a camera pose curve represented by motion sensor data can be obtained by modeling a camera intrinsic parameter model based the OIS and gyro content.

The principle of the calibration algorithm is that the foregoing two curves are matched, and an optimal set of parameters will make the two curves be closest.

For example, FIG. 9 is a schematic diagram of a calibration process. Reference may be made to the relevant description of FIG. 9.

For example, OIS detailed calibration may include the following steps:

Step 1: Collection of a calibration video, where the EIS anti-shake algorithm needs to be disabled and the OIS anti-shake function needs to be enabled to collect images.

Step 2: Every two frames of images in the video are traversed, to perform feature detection on the images. The detection algorithm includes, but not limited to, common public algorithms such as ORB operator and Harris corner point.

Step 3: Feature points are matched and screened, and an algorithm used herein includes, but not limited to, common public algorithms such as ORB algorithm an SIFT algorithm.

Step 4: Collection of OIS data, where the specific data is as mentioned above.

Step 5: A set of OIS parameters is determined based on a search algorithm, which includes, but not limited to, common public algorithms such as automl.

Step 6: Motion of the OIS is restored through the formula $$H = KRK_{ois}^{-1},$$

and a gyroscope pose difference between two adjacent frames is corrected to the same pose through the R matrix.

Step 7: Matching feature points of two frames of images obtained through detection are converted to the same pose through the H matrix.

Step 8: For a matched feature point pair, if the parameters such as OIS are accurate, the coordinates of the matched point pair should completely coincide with each other, so that an error can be calculated for the coordinates of the matched point pair. Error calculation methods include, but not limited to, common public algorithms such as MSE.

Step 9: After the error is calculated, selection of a next set of parameters is guided according to the error value, and this cycle is repeated until a set of parameters that minimizes a cumulative error of the video is found.

For example, this application provides a three-axis Sensor Shift OIS+EIS solution, including the following content: The OIS module is in a sensor shift working mode, and has three correction axes, which are respectively expressed as x-axis translation, y-axis translation, and z-axis rotation. The amounts of translation and rotation of the OIS module are recorded in real time through the Hall sensor, and the compensation amount is transmitted to the EIS software algorithm through the ISP. The EIS algorithm receives data from the gyroscope sensor, the OIS Hall sensor, the image sensor, and the like, and performs, according to data of a motion information sensor, shake compensation on an image sequence generated by the image sensor. The EIS algorithm performs shake compensation according to a displacement and an angle transmitted by the OIS Hall sensor, to restore the motion of the OIS device to motion under a standard camera. The EIS algorithm performs auxiliary path planning according to the displacement and the angle transmitted by the OIS Hall sensor, and performs image shake compensation at a large angle based on collection, movement, and deformation of the image sequence. The anti-shake capability of the OIS+EIS algorithm is controlled by adjusting a cropping range of the image sequence, and a larger cropping range of the image sequence indicates a stronger anti-shake capability of the OIS+EIS algorithm.

Optionally, based on the embodiments of this application, when perform rotation motion by using a mobile phone, relatively high inter-frame definition and a relatively good anti-shake effect can still be obtained.

Optionally, based on the embodiments of this application, sensor shift has a Z-axis compensation and correction capability under rotation motion.

Optionally, based on the embodiments of this application, under the premise of the three-axis Sensor shift OIS module, digital zoom is performed on the video picture under the lens, and the anti-shake capability under different zooms is evaluated by using devices such as a vibration table that can simulate constant jitter. The anti-shake capability of OIS+EIS is not consistent under different digital zooms in the same device module.

Optionally, based on the embodiments of this application, data of the image sensor is collected, and the OIS+EIS anti-shake capability is greater than the direct anti-shake capability of the image sensor.

It is to be understood that, the foregoing descriptions provided by using an example are intended to help a person skilled in the art to understand embodiments of this application, and is not intended to limit embodiments of this application to specific values or specific scenarios in the example. Apparently, a person skilled in the art can make various equivalent modifications or changes based on the foregoing examples, and such modifications or changes shall also fall within the scope of the embodiments of this application.

Figure 13:
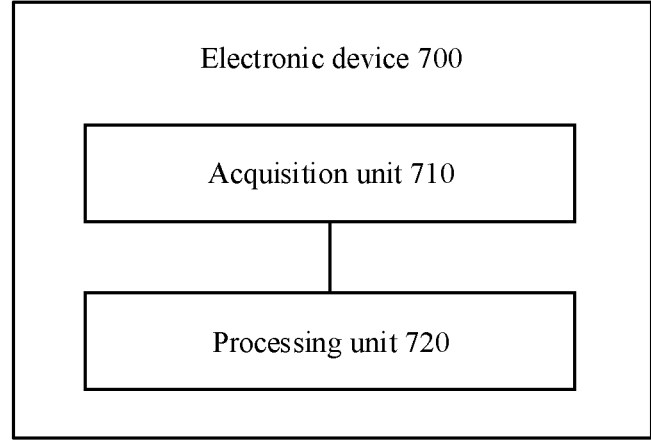
FIG. 13 is a schematic diagram of an electronic device according to an embodiment of this application.
Figure 14:
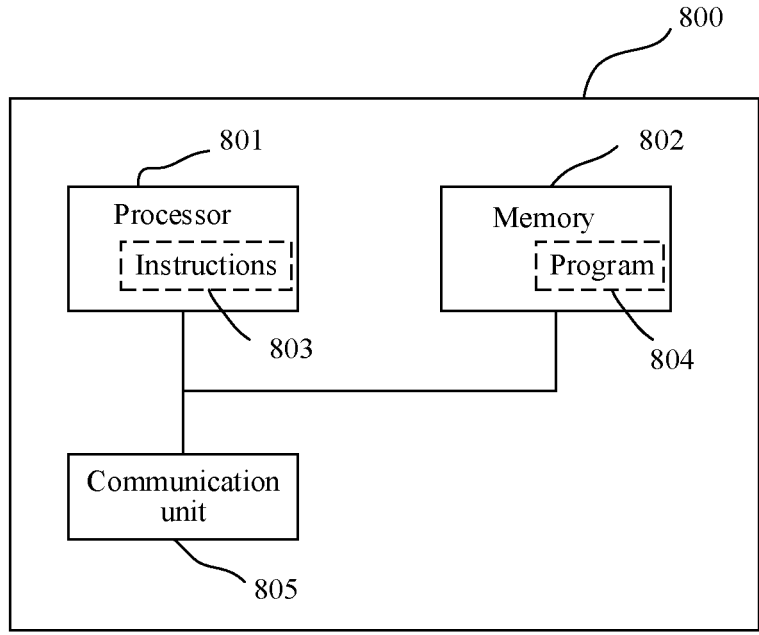
FIG. 14 is a schematic diagram of an electronic device to which this application is applicable.

The foregoing has described in detail the image anti-shake method provided in the embodiments of this application with reference to FIG. 1 to FIG. 12, and the following describes in detail the apparatus embodiments of this application with reference to FIG. 13 and FIG. 14. It is to be understood that, the apparatus in embodiments of this application may perform the methods in the foregoing embodiments of this application, that is, for specific working processes of the following products, refer to corresponding processes in the foregoing method embodiments.

FIG. 13 is a schematic structural diagram of an electronic device according to an embodiment of this application. The electronic device 700 includes an acquisition unit 710 and a processing module 720.

The processing unit 720 is configured to enable a camera application; the acquisition unit 710 is configured to receive a first operation; the processing unit 720 is configured to: acquire a first image stream in response to the first operation, where the first image stream is an image stream collected by the camera in real time, the first image stream is an image stream that has been subjected to first anti-shake processing, and the first anti-shake processing includes anti-shake processing performed by the three-axis optical image stabilization controller; and process the first image stream based on a first parameter and a second parameter to obtain a second image stream, where the first parameter is obtained based on the first anti-shake processing, the first parameter is used for restoring the first anti-shake processing, the second parameter is used for second anti-shake processing, and the first anti-shake processing is different from the second anti-shake processing.

Optionally, in an embodiment, the processing unit 720 is specifically configured to:

restore the first anti-shake processing on the first image stream based on the first parameter, to obtain a third image stream; and perform the second anti-shake processing on the third image stream based on the second parameter, to obtain the second image stream.

Optionally, in an embodiment, the electronic device includes a gyroscope sensor, the second parameter is obtained based on shake information collected by the gyroscope sensor, and the shake information is used for representing a pose change of the electronic device during photographing.

Optionally, in an embodiment, the second parameter is obtained based on the shake information and a constraint condition, and the constraint condition means that each image frame in the second image stream meets a preset image range.

Optionally, in an embodiment, the electronic device 700 further includes a Hall sensor, the Hall sensor is configured to collect data of the first anti-shake processing, and the processing unit 720 is specifically configured to:

convert the data of the first anti-shake processing into a three-axis offset, where the three-axis offset includes an offset in an X-axis direction, an offset in a Y-axis direction, and a rotation angle in a Z-axis direction; and obtain the first parameter according to the three-axis offset.

Optionally, in an embodiment, the first image sequence includes N image frames, N is a positive integer greater than 1, and the processing unit 720 is specifically configured to:

perform feature point detection on an $(N-1)^{th}$ image frame and an $N^{th}$ image frame, to obtain a feature pair, where the feature pair includes a first feature point in the $(N-1)^{th}$ image frame and a second feature point in the $N^{th}$ image frame, and the first feature point corresponds to the second feature point; and obtain the three-axis offset according to the feature pair and the data of the first anti-shake processing.

Optionally, in an embodiment, the shake information includes: rotation data and/or translation data on an X-axis and a Y-axis and rotation data on a Z-axis of the electronic device.

It should be noted that the electronic device 700 is embodied in a form of functional units. The term "unit" herein may be implemented in a form of software and/or hardware, which is not specifically limited.

For example, "unit" may be a software program, a hardware circuit or a combination of both to realize the foregoing functions. The hardware circuit may be an application specific integrated circuit (ASIC), an electronic circuit, a processor (for example, a shared processor, a dedicated processor, or a packet processor) configured to execute one or more software or firmware programs, a memory, a combined logical circuit, and/or another suitable component that supports the described functions.

Therefore, units of examples described in embodiments of this application can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this application.

FIG. 14 is a schematic structural diagram of an electronic device according to this application. The dashed line in FIG. 14 indicates that the unit or the module is optional. An electronic device 800 may be configured to implement the methods in the foregoing method embodiments.

The electronic device 800 includes one or more processors 801, and the one or more processors 801 may support the electronic device 800 to implement the image anti-shake method in the foregoing method embodiments. The processor 801 may be a general-purpose processor or a special-purpose processor. For example, the processor 801 may be a central processor (CPU), a digital signal processor (DSP), an application-specific integrated circuit (ASIC), a field-programmable gate array (FPGA), or another programmable logic device such as a discrete gate or a transistor logic component or a discrete hardware assembly.

The processor 801 may be configured to control the electronic device 800, execute a software program, and process data of the software program. The electronic device 800 may further include a communication unit 805, configured to implement input (receiving) and output (sending) of a signal.

For example, the electronic device 800 may be a chip, and the communication unit 805 may be an input and/or output circuit of the chip, or the communication unit 805 may be a communication interface of the chip, and the chip may be used as a component of a terminal device or other electronic device.

In another example, the electronic device 800 may be a terminal device, and the communication unit 805 may be a transceiver of the terminal device, or the communication unit 805 may be a transceiver circuit of the terminal device.

The electronic device 800 may include one or more memories 802 on which a program 804 is stored, and the program 804 may be executed by the processor 801 to generate instructions 803, so that the processor 801 performs the methods described in the above method embodiments according to the instructions 803.

Optionally, the memory 802 may further store data. Optionally, the processor 801 may further read the data stored in the memory 802, where the data may be stored at a same storage address as the program 804, or stored at a storage address different from a storage address of the program 804.

The processor 801 and the memory 802 may be disposed separately or integrated together, for example, integrated on a system on chip (SOC) of the terminal device.

For example, the memory 802 may be configured to store the related program 804 of the image anti-shake method provided in the embodiments of this application, and the processor 801 may be configured to invoke, during video processing, the related program 804 of the image anti-shake method stored in the memory 802 to perform the image anti-shake method in the embodiments of this application, for example: enabling a camera application; receiving a first operation; acquiring a first image stream in response to the first operation, where the first image stream is an image stream collected by the camera in real time, the first image stream is an image stream that has been subjected to first anti-shake processing, and the first anti-shake processing includes anti-shake processing performed by the three-axis optical image stabilization controller; and processing the first image stream based on a first parameter and a second parameter to obtain a second image stream, where the first parameter is obtained based on the first anti-shake processing, the first parameter is used for restoring the first anti-shake processing, the second parameter is used for second anti-shake processing, and the first anti-shake processing is different from the second anti-shake processing.

This application further provides a computer program product. When the computer program product is executed by the processor 801, the method according to any method embodiment of this application is implemented.

The computer program product may be stored in a memory 802, such as a program 804, and the program 804 is finally converted into an executable object file that can be executed by the processor 801 through processing processes such as preprocessing, compilation, assembly, and linking.

This application further provides a computer-readable storage medium. The computer-readable storage medium stores a computer program. When the computer program is executed by a computer, the method according to any method embodiment of this application is implemented. The computer program may be an advanced language program, or may be an executable target program.

The computer-readable storage medium may be, for example, a memory 802. The memory 802 may be a volatile memory or a non-volatile memory, or the memory 802 may simultaneously include a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (random access memory, RAM), which serves as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

It may be clearly understood by a person skilled in the art that, for convenience and brevity of description, for a specific working process and an achieved technical effect of the foregoing described apparatus and device, refer to a corresponding process and technical effect in the foregoing method embodiments. Details are not described herein again.

In the several embodiments provided in this application, the disclosed system, apparatus, and method may be implemented in another manner. For example, some characteristics of the method embodiments described above may be omitted or not implemented. The described apparatus embodiment is merely an example, and unit division is merely logical function division and may be another division in actual implementation. A plurality of units or components may be combined or integrated into another system. In addition, the coupling between the units or the coupling between the components may be direct coupling or indirect coupling, and the coupling includes electrical, mechanical, or other forms of connection.

It is to be understood that, sequence numbers of the foregoing processes do not mean an execution sequence in various embodiments of this application. The execution sequence of the processes should be determined based on functions and internal logic of the processes, and should not be construed as any limitation on the implementation processes of embodiments of this application.

In addition, the terms "system" and "network" in this specification may be used interchangeably in this specification. In addition, the term "and/or" in this specification describes only an association relationship for describing associated objects and represents that three relationships may exist. For example, A and/or B may represent the following three cases: Only A exists, both A and B exist, and only B exists. In addition, the character "I" in this specification generally indicates an "or" relationship between the associated objects.

In summary, the foregoing descriptions are merely preferable embodiments of the technical solutions of this application, but are not intended to limit the protection scope of this application. Any modification, equivalent replacement, or improvement made without departing from the spirit and principle of this application shall fall within the protection scope of this application.

What is claimed is:

1. An image anti-shake method, applied to an electronic device, wherein the electronic device comprises a camera and a three-axis optical image stabilization controller, and the method comprises:

enabling a camera application;

receiving a first operation;

acquiring a first image stream in response to the first operation, wherein the first image stream is an image stream collected by the camera in real time, the first image stream is an image stream that has been subjected to first anti-shake processing, and the first anti-shake processing comprises anti-shake processing performed by the three-axis optical image stabilization controller, wherein the three-axis optical image stabilization controller controls an image sensor to move on an X-axis and a Y-axis, and rotate on a Z-axis; and processing the first image stream based on a first parameter and a second parameter to obtain a second image stream, wherein the first parameter is obtained based on the first anti-shake processing, the first parameter is used for restoring the first anti-shake processing through a camera intrinsic parameter matrix of the three-axis optical image stabilization controller, the second parameter is used for second anti-shake processing, and the first anti-shake processing is different from the second anti-shake processing, wherein the camera intrinsic parameter matrix comprises at least one element that is a function of a focal length of the camera and an angle between an optical center of the image sensor and a rotated Z-axis.

2. The image anti-shake method according to claim 1, wherein the processing the first image stream based on a first parameter and a second parameter to obtain a second image stream comprises:

restoring the first anti-shake processing on the first image stream based on the first parameter, to obtain a third image stream; and performing the second anti-shake processing on the third image stream based on the second parameter, to obtain the second image stream.

3. The image anti-shake method according to claim 1, wherein the electronic device comprises a gyroscope sensor, the second parameter is obtained based on shake information collected by the gyroscope sensor, and the shake information is used for representing a pose change of the electronic device during photographing.

4. The image anti-shake method according to claim 3, wherein the second parameter is obtained based on the shake information and a constraint condition, and the constraint condition means that each image frame in the second image stream meets a preset image range.

5. The image anti-shake method according to claim 3, wherein the shake information comprises: rotation data and/or translation data on an X-axis and a Y-axis and rotation data on a Z-axis of the electronic device.

6. The image anti-shake method according to claim 1, wherein the electronic device further comprises a Hall sensor, the Hall sensor is configured to collect data of the first anti-shake processing, and the image anti-shake method further comprises:

converting the data of the first anti-shake processing into a three-axis offset, wherein the three-axis offset comprises an offset in an X-axis direction, an offset in a Y-axis direction, and a rotation angle in a Z-axis direction; and obtaining the first parameter according to the three-axis offset.

7. The image anti-shake method according to claim 6, wherein the first image stream comprises N image frames, N is a positive integer greater than 1, and the converting the data of the first anti-shake processing into a three-axis offset comprises:

performing feature point detection on an $(N-1)^{th}$ image frame and an $N^{th}$ image frame, to obtain a feature pair, wherein the feature pair comprises a first feature point in the $(N-1)^{th}$ image frame and a second feature point in the $N^{th}$ image frame, and the first feature point corresponds to the second feature point; and obtaining the three-axis offset according to the feature pair and the data of the first anti-shake processing.

8. An electronic device, wherein the electronic device comprises one or more processors, a memory, and a display screen, the memory is coupled to the one or more processors, the memory is configured to store computer program code, the computer program code comprises computer instructions, and the one or more processors invoke the computer instructions to cause the electronic device to perform the following steps:

enabling a camera application;

receiving a first operation;

acquiring a first image stream in response to the first operation, wherein the first image stream is an image stream collected by a camera in real time, the first image stream is an image stream that has been subjected to first anti-shake processing, and the first anti-shake processing comprises anti-shake processing performed by a three-axis optical image stabilization controller, wherein the three-axis optical image stabilization controller controls an image sensor to move on an X-axis and a Y-axis, and rotate on a Z-axis, and processing the first image stream based on a first parameter and a second parameter to obtain a second image stream, wherein the first parameter is obtained based on the first anti-shake processing, the first parameter is used for restoring the first anti-shake processing through a camera intrinsic parameter matrix of the three-axis optical image stabilization controller, the second parameter is used for second anti-shake processing, and the first anti-shake processing is different from the second anti-shake processing, wherein the camera intrinsic parameter matrix comprises at least one element that is a function of a focal length of the camera and an angle between an optical center of the image sensor and a rotated Z-axis.

9. The electronic device according to claim 8, wherein the processing the first image stream based on a first parameter and a second parameter to obtain a second image stream comprises:

restoring the first anti-shake processing on the first image stream based on the first parameter, to obtain a third image stream; and performing the second anti-shake processing on the third image stream based on the second parameter, to obtain the second image stream.

10. The electronic device according to claim 8, wherein the electronic device comprises a gyroscope sensor, the second parameter is obtained based on shake information collected by the gyroscope sensor, and the shake information is used for representing a pose change of the electronic device during photographing.

11. The electronic device according to claim 10, wherein the second parameter is obtained based on the shake information and a constraint condition, and the constraint condition means that each image frame in the second image stream meets a preset image range.

12. The electronic device according to claim 10, wherein the shake information comprises: rotation data and/or translation data on an X-axis and a Y-axis and rotation data on a Z-axis of the electronic device.

13. The electronic device according to claim 8, wherein the electronic device further comprises a Hall sensor, the Hall sensor is configured to collect data of the first anti-shake processing, and wherein the one or more processors invoke the computer instructions to cause the electronic device to perform:

converting the data of the first anti-shake processing into a three-axis offset, wherein the three-axis offset comprises an offset in an X-axis direction, an offset in a Y-axis direction, and a rotation angle in a Z-axis direction; and obtaining the first parameter according to the three-axis offset.

14. The electronic device according to claim 13, wherein the first image stream comprises N image frames, N is a positive integer greater than 1, and the converting the data of the first anti-shake processing into a three-axis offset comprises:

performing feature point detection on an $(N-1)^{th}$ image frame and an $N^{th}$ image frame, to obtain a feature pair, wherein the feature pair comprises a first feature point in the $(N-1)^{th}$ image frame and a second feature point in the $N^{th}$ image frame, and the first feature point corresponds to the second feature point; and obtaining the three-axis offset according to the feature pair and the data of the first anti-shake processing.

15. A non-transitory computer-readable storage medium, wherein the computer-readable storage medium stores a computer program, and when the computer program is executed by a processor, the processor is caused to perform following steps:

enabling a camera application;

receiving a first operation;

acquiring a first image stream in response to the first operation, wherein the first image stream is an image stream collected by a camera in real time, the first image stream is an image stream that has been subjected to first anti-shake processing, and the first anti-shake processing comprises anti-shake processing performed by a three-axis optical image stabilization controller, wherein the three-axis optical image stabilization controller controls an image sensor to move on an X-axis and a Y-axis, and rotate on a Z-axis; and processing the first image stream based on a first parameter and a second parameter to obtain a second image stream, wherein the first parameter is obtained based on the first anti-shake processing, the first parameter is used for restoring the first anti-shake processing through a camera intrinsic parameter matrix of the three-axis optical image stabilization controller, the second parameter is used for second anti-shake processing, and the first anti-shake processing is different from the second anti-shake processing, wherein the camera intrinsic parameter matrix comprises at least one element that is a function of a focal length of the camera and an angle between an optical center of the image sensor and a rotated Z-axis.

16. The non-transitory computer-readable storage medium according to claim 15, wherein the processing the first image stream based on a first parameter and a second parameter to obtain a second image stream comprises:

restoring the first anti-shake processing on the first image stream based on the first parameter, to obtain a third image stream; and performing the second anti-shake processing on the third image stream based on the second parameter, to obtain the second image stream.

17. The non-transitory computer-readable storage medium according to claim 15, wherein the second parameter is obtained based on shake information collected by a gyroscope sensor, and the shake information is used for representing a pose change during photographing.

18. The non-transitory computer-readable storage medium according to claim 17, wherein the second parameter is obtained based on the shake information and a constraint condition, and the constraint condition means that each image frame in the second image stream meets a preset image range.

19. The non-transitory computer-readable storage medium according to claim 15, wherein a hall sensor is configured to collect data of the first anti-shake processing, and when the computer program is executed by a processor, the processor is caused to perform:

converting the data of the first anti-shake processing into a three-axis offset, wherein the three-axis offset comprises an offset in an X-axis direction, an offset in a Y-axis direction, and a rotation angle in a Z-axis direction; and obtaining the first parameter according to the three-axis offset.

20. The non-transitory computer-readable storage medium according to claim 19, wherein the first image stream comprises N image frames, N is a positive integer greater than 1, and the converting the data of the first anti-shake processing into a three-axis offset comprises;

performing feature point detection on an $(N-1)^{th}$ image frame and an $N^{th}$ image frame, to obtain a feature pair, wherein the feature pair comprises a first feature point in the $(N-1)^{th}$ image frame and a second feature point in the $N^{th}$ image frame, and the first feature point corresponds to the second feature point; and obtaining the three-axis offset according to the feature pair and the data of the first anti-shake processing.

* * * * *